(12) United States Patent
Wang

(10) Patent No.: US 11,917,132 B2
(45) Date of Patent: Feb. 27, 2024

(54) CONSTRAINTS ON REFERENCE PICTURE ORDER

(71) Applicant: Bytedance Inc., Los Angeles, CA (US)

(72) Inventor: Ye-Kui Wang, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/945,273

(22) Filed: Sep. 15, 2022

(65) Prior Publication Data

US 2023/0022078 A1    Jan. 26, 2023

Related U.S. Application Data

(63) Continuation of application No. PCT/US2021/022584, filed on Mar. 16, 2021.
(Continued)

(51) Int. Cl.
| | |
|---|---|
| H04N 19/105 | (2014.01) |
| H04N 19/109 | (2014.01) |
| H04N 19/159 | (2014.01) |
| H04N 19/172 | (2014.01) |
| H04N 19/174 | (2014.01) |

(Continued)

(52) U.S. Cl.
CPC ......... H04N 19/105 (2014.11); H04N 19/109 (2014.11); H04N 19/159 (2014.11); H04N 19/172 (2014.11); H04N 19/174 (2014.11); H04N 19/188 (2014.11);
(Continued)

(58) Field of Classification Search
CPC .. H04N 19/105; H04N 19/109; H04N 19/159; H04N 19/172; H04N 19/174; H04N 19/188; H04N 19/31; H04N 19/46; H04N 19/503
See application file for complete search history.

(56) References Cited

U.S. PATENT DOCUMENTS

| | | | |
|---|---|---|---|
| 9,641,862 B2 | 5/2017 | Hannuksela | |
| 2014/0003537 A1 | 1/2014 | Ramasubramonian | |
| | (Continued) | | |

FOREIGN PATENT DOCUMENTS

| | | |
|---|---|---|
| JP | 2020017970 A | 1/2020 |
| WO | 2017053351 A1 | 3/2017 |
| | (Continued) | |

OTHER PUBLICATIONS

Document: JVET-Q2000-v1, Sullivan, G., et al., "Meeting Report of the 17th Meeting of the Joint Video Experts Team (JVET), Brussels BE, Jan. 7-17, 2020", Joint Video Experts Team (JVET) of ITU-T SG 16 WP 3 and ISO/IEC JTC 1/SC 29/WG 11 17th Meeting: Brussels, BE, Jan. 7-17, 2020, 378 pages.
(Continued)

*Primary Examiner* — Jeremiah C Hallenbeck-Huber
(74) *Attorney, Agent, or Firm* — Conley Rose, P.C.

(57) ABSTRACT

A video processing method includes performing a conversion between a video having one or more video layers comprising a current picture comprising a current slice and a bitstream of the video according to a rule. The rule specifies a condition under which a reference picture list for the current slice is disallowed to have an active entry that refers to a picture that precedes, in a decoding order or an output order, an intra random access point picture associated with the current picture.

20 Claims, 17 Drawing Sheets

810

Performing a conversion between a video having one or more video layers comprising one or more video pictures and a bitstream of the video according to a rule, and wherein the rule specifies a condition under which no picture that has been generated by a decoding process for generating an unavailable reference picture is referred to by an active entry in a reference picture list of a current slice of a current picture — 812

Related U.S. Application Data

(60) Provisional application No. 62/992,046, filed on Mar. 19, 2020.

(51) Int. Cl.
*H04N 19/169* (2014.01)
*H04N 19/31* (2014.01)
*H04N 19/503* (2014.01)
*H04N 19/46* (2014.01)

(52) U.S. Cl.
CPC ............. *H04N 19/31* (2014.11); *H04N 19/46* (2014.11); *H04N 19/503* (2014.11)

(56) References Cited

U.S. PATENT DOCUMENTS

| | | | |
|---|---|---|---|
| 2015/0023422 | A1 | 1/2015 | Zhang et al. |
| 2015/0103926 | A1 | 4/2015 | Hannuksela |
| 2015/0312580 | A1 | 10/2015 | Hannuksela |
| 2015/0373338 | A1 | 12/2015 | Hendry |
| 2016/0029019 | A1 | 1/2016 | Deshpande |
| 2017/0094302 | A1 | 3/2017 | Hendry |
| 2017/0171563 | A1 | 6/2017 | Deshpande |
| 2018/0131951 | A1 | 5/2018 | Hannuksela |
| 2019/0012839 | A1* | 1/2019 | Wang .................. H04N 19/00 |
| 2020/0204806 | A1* | 6/2020 | Jin .................... H04N 19/132 |
| 2021/0203970 | A1 | 7/2021 | Choi |
| 2021/0227231 | A1* | 7/2021 | Hannuksela ........... H04N 19/46 |
| 2021/0409691 | A1 | 12/2021 | Hendry |
| 2022/0021896 | A1 | 1/2022 | Hendry |
| 2022/0150546 | A1 | 5/2022 | Sjoberg |
| 2022/0159245 | A1 | 5/2022 | Wang |
| 2022/0345745 | A1 | 10/2022 | Deshpande |
| 2022/0353536 | A1 | 11/2022 | Samuelsson |
| 2022/0377344 | A1 | 11/2022 | He |
| 2022/0394301 | A1 | 12/2022 | Deshpande |
| 2023/0026475 | A1 | 1/2023 | Deshpande |
| 2023/0033332 | A1 | 2/2023 | Hendry |

FOREIGN PATENT DOCUMENTS

| | | | |
|---|---|---|---|
| WO | 2017062373 | A1 | 4/2017 |
| WO | 2020037278 | A1 | 2/2020 |

OTHER PUBLICATIONS

Foreign Communication From a Related Counterpart Application, Indian Application No. 202247052957, Indian Office Action dated Nov. 29, 2022, 6 pages.
Foreign Communication From a Related Counterpart Application, Indian Application No. 202247053489, Indian Office Action dated Nov. 30, 2022, 5 pages.
Foreign Communication From a Related Counterpart Application, Indian Application No. 202247053594, Indian Office Action dated Dec. 21, 2022, 7 pages.
Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11, 17th Meeting: Brussels, BE, Jan. 7-17, 2020, 28 pages.
ITU-T and ISO/IEC, Series H: Audiovisual and Multimedia Systems Infrastructure of audiovisual services—Coding of moving video High efficiency video coding, Rec. ITU-T H.265 | ISO/IEC 23008-2 (in force edition), Feb. 2018, 692 pages.
Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
VTM software, Retrieved from the internet: https://vcgit.hhi.fraunhofer.de/jvet/VVCSoftware_VTM.git, Nov. 30, 2022, 3 pages.
Document: JCT3V-C1004_d1, Tech, G., et al. "MV-HEVC Draft Text 3 (ISO/IEC 23008-2 PDAM2)"; Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013, 34 pages.
Document: JVET-Q_Notes_dA, Sullivan, G., et al. "Meeting Report of the 17th Meeting of the Joint Video Experts Team (JVET)" Joint Video Experts Team (JVET) of ITU-T SG 16 WP 3 and ISO/IEC JTC 1/SC 29/WG 11, 17th Meeting: Brussels, BE, Jan. 7-17, 2020, 305 pages.
Foreign Communication From a Related Counterpart Application, International Application No. PCT/US2021/022572, International Search Report dated Sep. 17, 2021, 60 pages.
Foreign Communication From a Related Counterpart Application, International Application No. PCT/US2021/022576, International Search Report dated Jun. 3, 2021, 9 pages.
Foreign Communication From a Related Counterpart Application, International Application No. PCT/US2021/022584, International Search Report dated May 26, 2021, 9 pages.
Non-Final Office Action dated Feb. 6, 2023, 92 pages, U.S. Appl. No. 17/944,870, filed Sep. 14, 2022.
Non-Final Office Action dated Feb. 13, 2023, 20 pages, U.S. Appl. No. 17/946,335, filed Sep. 16, 2022.
Nokia Corporation, "Issues of Gradual Decoding Refresh in AVC File Format," ISO/IEC JTC1/SC29/WG11 MPEG 2003/M9853, Jul. 2003, 5 pages.
Document: JVET-Q2001-vC, Bross, B., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 508 pages.
Document: JVET-S0123, Seregin, V., et al., "AHG9: On reference picture list constraints," Joint Video Experts Team (JVET) of ITU-T SG 16 WP 3 and ISO/IEC JTC 1/SC 29/WG 11 19th Meeting: by teleconference, Jun. 22-Jul. 1, 2020, 14 pages.
Document: JVET-S0192, Choi, B., "AHG9: On reference picture list with generating unavailable reference picture," Joint Video Experts Team (JVET) of ITU-T SG 16 WP 3 and ISO/IEC JTC 1/SC 29/WG 11 19th Meeting: by teleconference, Jun. 22-Jul. 1, 2020, 7 pages.
Document: JVET-R0042-v1, Wang, Y., "AHG8/AHG9/AHG12: On mixed subpicture types within a picture," Joint Video Experts Team (JVET) of ITU-T SG 16 WP 3 and ISO/IEC JTC 1/SC 29/WG 11 18th Meeting: by teleconference, Apr. 15-24, 2020, 10 pages.
Foreign Communication From a Related Counterpart Application, European Application No. 21771751.1, Extended European Search Report dated Sep. 12, 2023, 11 pages.
Foreign Communication From a Related Counterpart Application, European Application No. 21771100.1, Extended European Search Report dated Aug. 2, 2023, 11 pages.
Final Office Action dated Jul. 5, 2023, 25 pages, U.S. Appl. No. 17/946,335, filed Sep. 16, 2022.

* cited by examiner

740

742

Performing a conversion between a video having one or more video layers comprising one or more video pictures and a bitstream of the video according to a format rule,
and
wherein the format rule specifies a constraint that (1) a trailing picture follows an associated intra random access point picture or a gradual decoder refresh picture in an output order, or (2) a picture having a same NAL (network abstraction layer) unit header layer identifier as that of the gradual decoder refresh picture precedes, in the output order, the gradual decoder refresh picture and all associated pictures of the gradual decoder refresh picture.

FIG. 7D

750

752 — Performing a conversion between a video having one or more video layers comprising one or more video pictures and a bitstream of the video according to a rule, and wherein the rule specifies to apply a constraint on a decoding order of a picture associated with an intra random access point picture and a non-leading picture if and only if the picture, the intra random access point picture and the non-leading picture are in a same layer

Performing a conversion between a video having one or more video layers comprising one or more video pictures and a bitstream of the video according to a rule, and wherein the rule specifies an order of a leading picture, a random access decodable leading picture and a random access skipped leading picture associated with a gradual decoding refresh picture.

810 →

812 — Performing a conversion between a video having one or more video layers comprising one or more video pictures and a bitstream of the video according to a rule, and wherein the rule specifies a condition under which no picture that has been generated by a decoding process for generating an unavailable reference picture is referred to by an active entry in a reference picture list of a current slice of a current picture

Performing a conversion between a video having one or more video layers comprising a current picture comprising a current slice and a bitstream of the video according to a rule, and wherein the rule specifies a condition under which a reference picture list for the current slice is disallowed to have an active entry that refers to a picture that precedes, in a decoding order or an output order, an intra random access point picture associated with the current picture.

FIG. 9A

CONSTRAINTS ON REFERENCE PICTURE ORDER

CROSS-REFERENCE TO RELATED APPLICATIONS

This application is a continuation of International Patent Application No. PCT/US2021/022584, filed on Mar. 16, 2021 which claims the priority to and benefits of U.S. Provisional Patent Application No. U.S. 62/992,046 filed on Mar. 19, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of video using a bitstream syntax that provides improved performance. The disclosed methods may be used by apparatus that performs video processing such as video encoding or video decoding or video transcoding.

In one example aspect, a video processing method is disclosed. The method includes performing a conversion between a video having one or more video layers comprising one or more video pictures and a coded representation of the video; wherein the coded representation is organized according to a rule that specifies that a first video picture that is an intra random access point picture of a second picture and the second picture are constrained to belong to a same video layer.

In another example aspect, another video processing method is disclosed. The method includes performing a conversion between a video having one or more video layers comprising one or more video pictures and a coded representation of the video, wherein the coded representation conforms to a format rule that specifies that a trailing picture in the coded representation following a first type of picture that is an intra random access point is also permitted to be associated with a second type of picture that includes a gradual decoding refresh picture.

In another example aspect, another video processing method is disclosed. The method includes performing a conversion between a video having one or more video layers comprising one or more video pictures and a coded representation of the video, wherein the coded representation conforms to a format rule that specifies a constraint for an output order of pictures preceding an intra random access point are is in a decoding order such that the output order is applicable only to pictures in a same video layer.

In another example aspect, another video processing method is disclosed. The method includes performing a conversion between a video having one or more video layers comprising one or more video pictures and a coded representation of the video, wherein the coded representation conforms to a format rule that specifies a constraint that (1) a trailing picture must follow an associated intra random access point picture (IRAP) or a gradual decoder refresh (GDR) picture in an output order, or (2) a picture having a same layer id as that of the GDR picture must precede, in the output order, the GDR picture and all associated pictures of the GDR picture.

In another example aspect, another video processing method is disclosed. The method includes performing a conversion between a video having one or more video layers comprising one or more video pictures and a coded representation of the video, wherein the conversion conforms to a rule that an order constraint is applicable to a picture, an intra random access point (IRAP) picture and a non-leading picture if and only if the picture, the IRAP picture and the non-leading picture are in a same layer, wherein the rule is one of: (a) a first rule specifying a value of a field sequence and a decoding order, or (b) an order of leading and/or non-leading pictures of a layer.

In another example aspect, another video processing method is disclosed. The method includes performing a conversion between a video having one or more video layers comprising one or more video pictures and a coded representation of the video, wherein the conversion conforms to a rule that specifies an order of a leading picture, a random access decodable leading (RADL) picture and a random access skipped leading (RASL) picture associated with a gradual decoding refresh (GDR) picture.

In another example aspect, another video processing method is disclosed. The method includes performing a conversion between a video having one or more video layers comprising one or more video pictures and a coded representation of the video, wherein the conversion conforms to a rule that specifies that a constraint for a reference picture list for a clean random access picture is limited to a layer.

In another example aspect, another video processing method is disclosed. The method includes performing a conversion between a video having one or more video layers comprising one or more video pictures and a coded representation of the video, wherein the conversion conforms to a rule that specifies a condition under which a current picture is allowed to refer to an entry in a reference picture list that was generated by a decoding process for generating an unavailable reference picture.

In another example aspect, another video processing method is disclosed. The method includes performing a conversion between a video having one or more video layers comprising one or more video pictures and a coded representation of the video, wherein the conversion conforms to a rule of order between a current picture and a reference picture list corresponding to the current picture.

In another example aspect, another video processing method is disclosed. The method includes performing a conversion between a video having one or more video layers comprising one or more video pictures and a bitstream of the video according to a format rule, and wherein the format rule specifies that a first video picture that is an associated intra random access point picture of a second picture and the second picture are constrained to belong to a same video layer.

In another example aspect, another video processing method is disclosed. The method includes performing a conversion between a video having one or more video layers comprising one or more video pictures and a bitstream of the video according to a format rule, and wherein the format rule specifies that a trailing picture in the bitstream is permitted to be associated with a gradual decoding refresh picture.

In another example aspect, another video processing method is disclosed. The method includes performing a conversion between a video having one or more video layers comprising one or more video pictures and a bitstream of the video according to a format rule, and wherein the format rule specifies that a constraint for an output order of pictures preceding an intra random access point in a decoding order is applicable to pictures in a same video layer.

In another example aspect, another video processing method is disclosed. The method includes performing a conversion between a video having one or more video layers comprising one or more video pictures and a bitstream of the video according to a format rule, and wherein the format rule specifies a constraint that (1) a trailing picture follows an associated intra random access point picture or a gradual decoder refresh picture in an output order, or (2) a picture having a same network abstraction layer (NAL) unit header layer identifier as that of the gradual decoder refresh picture precedes, in the output order, the gradual decoder refresh picture and all associated pictures of the gradual decoder refresh picture.

In another example aspect, another video processing method is disclosed. The method includes performing a conversion between a video having one or more video layers comprising one or more video pictures and a bitstream of the video according to a rule, and wherein the rule specifies to apply a constraint on a decoding order of a picture associated with an intra random access point picture and a non-leading picture if and only if the picture, the intra random access point picture and the non-leading picture are in a same layer.

In another example aspect, another video processing method is disclosed. The method includes performing a conversion between a video having one or more video layers comprising one or more video pictures and a bitstream of the video according to a rule, and wherein the rule specifies an order of a leading picture, a random access decodable leading picture and a random access skipped leading picture associated with a gradual decoding refresh picture.

In another example aspect, another video processing method is disclosed. The method includes performing a conversion between a video having one or more video layers comprising one or more video pictures and a bitstream of the video according to a rule, wherein the rule specifies that a constraint for a reference picture list for a slice of a clean random access picture is limited to a layer.

In another example aspect, another video processing method is disclosed. The method includes performing a conversion between a video having one or more video layers comprising one or more video pictures and a bitstream of the video according to a rule, and wherein the rule specifies a condition under which no picture that has been generated by a decoding process for generating an unavailable reference picture is referred to by an active entry in a reference picture list of a current slice of a current picture.

In another example aspect, another video processing method is disclosed. The method includes performing a conversion between a video having one or more video layers comprising one or more video pictures and a bitstream of the video according to a rule, and wherein the rule specifies a condition under which no picture that has been generated by a decoding process for generating an unavailable reference picture is referred to by an entry in a reference picture list of a current slice of a current picture.

In another example aspect, another video processing method is disclosed. The method includes performing a conversion between a video having one or more video layers comprising a current picture comprising a current slice and a bitstream of the video according to a rule, and wherein the rule specifies a condition under which a reference picture list for the current slice is disallowed to have an active entry that refers to a picture that precedes, in a decoding order or an output order, an intra random access point picture associated with the current picture.

In another example aspect, another video processing method is disclosed. The method includes performing a conversion between a video having one or more video layers comprising a current picture comprising a current slice and a bitstream of the video according to a rule, and wherein the rule specifies a condition under which a reference picture list for the current slice is disallowed to have an entry that refers to a picture that precedes, in a decoding order or an output order, an intra random access point picture associated with the current picture.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present document.

BRIEF DESCRIPTION OF DRAWINGS

FIGS. 7A to 7G show flowcharts for methods of video processing, in accordance with various examples.

FIGS. 8A and 8B show flowcharts for methods of video processing, in accordance with various examples.

FIGS. 9A and 9B show flowcharts for methods of video processing, in accordance with various examples.

DETAILED DESCRIPTION

Figure 1:
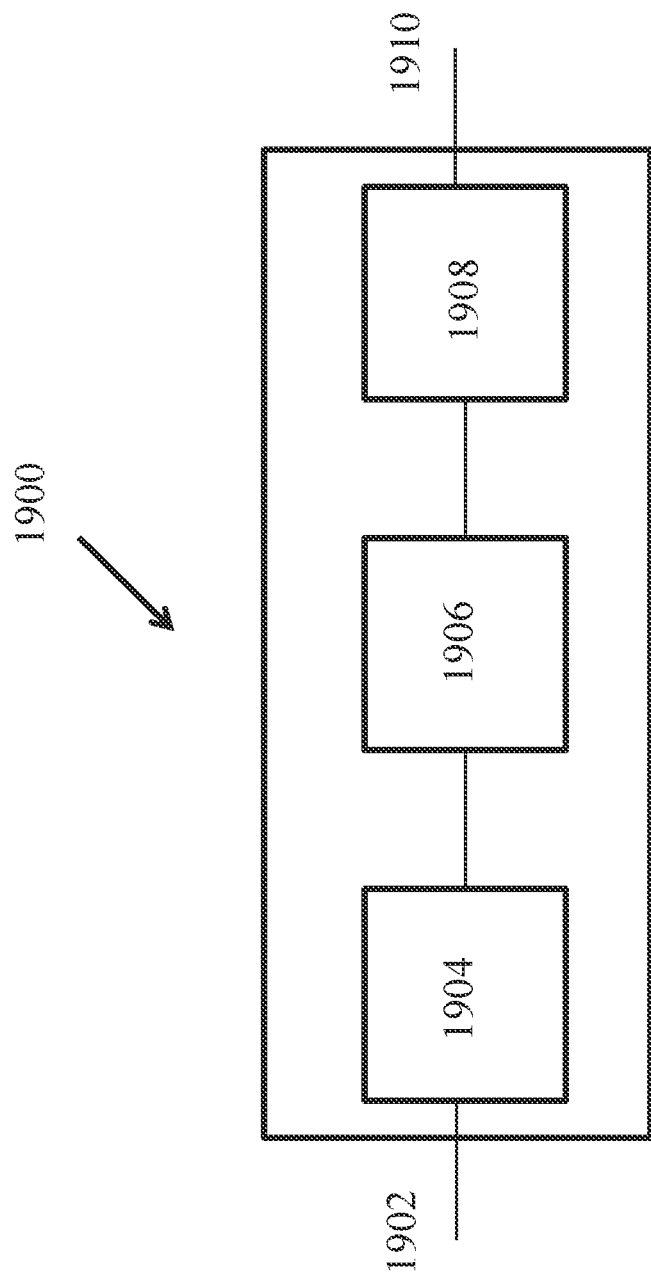
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. BRIEF SUMMARY

This document is related to video coding technologies. Specifically, it is about various aspects for supports of random access, sublayer switching, and scalability, including the definitions of different types of pictures and their relationships in terms decoding order, output order, and prediction relationship. The ideas may be applied individually or in various combination, to any video coding standard or non-standard video codec that supports multi-layer video coding, e.g., the being-developed Versatile Video Coding (VVC).

2. ABBREVIATIONS

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
CVSS Coded Video Sequence Start
DCI Decoding Capability Information
DPB Decoded Picture Buffer
EOB End Of Bitstream
EOS End Of Sequence
GDR Gradual Decoding Refresh
GOP Group-Of-Pictures
HEVC High Efficiency Video Coding
HLS Hypertext Transfer Protocol Live Streaming
HRD Hypothetical Reference Decoder
IDR Instantaneous Decoding Refresh
IRAP Intra Random Access Point
JEM Joint Exploration Model
MCTS Motion-Constrained Tile Sets
NAL Network Abstraction Layer
OLS Output Layer Set
PH Picture Header
POC Picture Order Count
PPS Picture Parameter Set
PTL Profile, Tier and Level
PU Picture Unit
RADL Random Access Decodable Leading (Picture)
RAP Random Access Point
RASL Random Access Skipped Leading (Picture)
RBSP Raw Byte Sequence Payload
RPL Reference Picture List
RPLC Reference Picture List Construction
RPR Reference Picture Resampling
RPS Reference Picture Set
SEI Supplemental Enhancement Information
SPS Sequence Parameter Set
STSA Step-wise Temporal Sublayer Access
SVC Scalable Video Coding
VCL Video Coding Layer
VPS Video Parameter Set
VTM VVC Test Model
VUI Video Usability Information
VVC Versatile Video Coding

3. INITIAL DISCUSSION

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, the Joint Video Exploration Team (WET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion Final Draft International Standard (FDIS) at the July 2020 meeting.

3.1. Scalable Video Coding (SVC) in General and in VVC

Scalable video coding (SVC), sometimes also referred to as scalability in video coding, refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or three-dimensional (3D) extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VPS), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. For example, the decoding capability, such as Decoded Picture Buffer (DPB) size, is specified in a manner that is independent of the number of layers in the bitstream to be decoded. Generally, a decoder designed for single-layer bitstreams does not need much change to be able to decode multi-layer bitstreams. Compared to the designs of multi-layer extensions of AVC and HEVC, the Hypertext Transfer Protocol Live Streaming (HLS) aspects have been significantly simplified at the sacrifice of some flexibilities. For example, an Intra Random Access Point (IRAP) Access Unit (AU) may be required to contain a picture for each of the layers present in the Coded Video Sequence (CVS).

3.2. Random Access and Its Supports in HEVC and VVC

Random access refers to starting access and decoding of a bitstream from a picture that is not the first picture of the bitstream in decoding order. To support tuning in and channel switching in broadcast/multicast and multiparty video conferencing, seeking in local playback and streaming, as well as stream adaptation in streaming, the bitstream needs to include frequent random access points, which are typically intra coded pictures but may also be inter-coded pictures (e.g., in the case of gradual decoding refresh).

HEVC includes signaling of intra random access points (IRAP) pictures in the Network Abstraction Layer (NAL) unit header, through NAL unit types. Three types of IRAP pictures are supported, namely instantaneous decoder refresh (IDR), clean random access (CRA), and broken link access (BLA) pictures. IDR pictures are constraining the inter-picture prediction structure to not reference any picture before the current group-of-pictures (GOP), conventionally referred to as closed-GOP random access points. CRA pictures are less restrictive by allowing certain pictures to reference pictures before the current GOP, all of which are discarded in case of a random access. CRA pictures are conventionally referred to as open-GOP random access points. BLA pictures usually originate from splicing of two bitstreams or part thereof at a CRA picture, e.g., during stream switching. To enable better systems usage of IRAP pictures, altogether six different NAL units are defined to signal the properties of the IRAP pictures, which can be used to better match the stream access point types as defined in the International Organization for Standardization (ISO) base media file format (ISOBMFF) which are utilized for random access support in dynamic adaptive streaming over Hypertext Transfer Protocol (DASH).

VVC supports three types of IRAP pictures, two types of IDR pictures (one type with or the other type without associated Random Access Decodable Leading (RADL) pictures) and one type of CRA picture. These are generally the same as in HEVC. The BLA picture types in HEVC are not included in VVC, for at least to two reasons: i) The basic functionality of BLA pictures can be realized by CRA pictures plus the end of sequence NAL unit, the presence of which indicates that the subsequent picture starts a new CVS in a single-layer bitstream. ii) There was a desire in specifying less NAL unit types than HEVC during the development of VVC, as indicated by the use of five instead of six bits for the NAL unit type field in the NAL unit header.

Another difference in random access support between VVC and HEVC is the support of Gradual Decoding Refresh (GDR) in a more normative manner in VVC. In GDR, the decoding of a bitstream can start from an inter-coded picture and although at the beginning not the entire picture region can be correctly decoded but after a number of pictures the entire picture region would be correct. AVC and HEVC also support GDR, using the recovery point Supplemental Enhancement Information (SEI) message for signaling of GDR random access points and the recovery points. In VVC, a new NAL unit type is specified for indication of GDR pictures and the recovery point is signaled in the picture header syntax structure. A CVS and a bitstream are allowed to start with a GDR picture. This means that it is allowed for an entire bitstream to contain only inter-coded pictures without a single intra-coded picture. A benefit of specifying GDR support this way is to provide a conforming behavior for GDR. GDR enables encoders to smooth the bit rate of a bitstream by distributing intra-coded slices or blocks in multiple pictures as opposed intra coding entire pictures, thus allowing significant end-to-end delay reduction, which is considered more important as ultralow delay applications like wireless display, online gaming, drone based applications become more popular.

Another GDR related feature in VVC is the virtual boundary signaling. The boundary between the refreshed region (i.e., the correctly decoded region) and the unrefreshed region at a picture between a GDR picture and its recovery point can be signaled as a virtual boundary, and when signaled, in-loop filtering across the boundary would not be applied, thus a decoding mismatch for some samples at or near the boundary would not occur. This can be useful when the application determines to display the correctly decoded regions during the GDR process.

IRAP pictures and GDR pictures can be collectively referred to as random access point (RAP) pictures.

3.3. Reference Picture Management and Reference Picture Lists (RPLs)

Reference picture management is a functionality that is generally involved in any video coding scheme that uses inter prediction. It manages the storage and removal of reference pictures into and from a decoded picture buffer (DPB) and puts reference pictures in their proper order in the RPLs.

The reference picture management of HEVC, including reference picture marking and removal from the decoded picture buffer (DPB) as well as reference picture list construction (RPLC), differs from that of AVC. Instead of the reference picture marking mechanism based on a sliding window plus adaptive memory management control operation (MMCO) in AVC, HEVC specifies a reference picture management and marking mechanism based on so-called reference picture set (RPS), and the RPLC is consequently based on the RPS mechanism. An RPS consists of a set of reference pictures associated with a picture, consisting of all reference pictures that are prior to the associated picture in decoding order, that may be used for inter prediction of the associated picture or any picture following the associated picture in decoding order. The reference picture set consists of five lists of reference pictures. The first three lists contain all reference pictures that may be used in inter prediction of the current picture and that may be used in inter prediction of one or more of the pictures following the current picture in decoding order. The other two lists consist of all reference pictures that are not used in inter prediction of the current picture but may be used in inter prediction of one or more of the pictures following the current picture in decoding order. RPS provides an "intra-coded" signaling of the DPB status, instead of an "inter-coded" signaling as in AVC, mainly for improved error resilience. The RPLC process in HEVC is based on the RPS, by signaling an index to an RPS subset for each reference index; this process is simpler than the RPLC process in AVC.

Reference picture management in VVC is more similar to HEVC than AVC, but is somewhat simpler and more robust. As in those standards, two RPLs, list 0 and list 1, are derived, but they are not based on the reference picture set concept used in HEVC or the automatic sliding window process used in AVC; instead they are signaled more directly. Reference pictures are listed for the RPLs as either active and inactive entries, and only the active entries may be used as reference indices in inter prediction of Coding Tree Units (CTUs) of the current picture. Inactive entries indicate other pictures to be held in the DPB for referencing by other pictures that arrive later in the bitstream.

3.4. Parameter Sets

AVC, HEVC, and VVC specify parameter sets. The types of parameter sets include SPS, PPS, Adaptation Parameter Set (APS), and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signaling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.5. Related Definitions in in VVC

Related definitions in the latest VVC text (in JVET-Q2001-vE/v15) are as follows.
  associated IRAP picture (of a particular picture): The previous IRAP picture in decoding order (when present) having the same value of nuh_layer_id as the particular picture.
  clean random access (CRA) Picture Unit (PU): A PU in which the coded picture is a CRA picture.
  clean random access (CRA) picture: An IRAP picture for which each Video Coding Layer (VCL) NAL unit has nal_unit_type equal to CRA_NUT.
  coded video sequence (CVS): A sequence of AUs that consists, in decoding order, of a CVSS AU, followed by zero or more AUs that are not CVSS AUs, including all subsequent AUs up to but not including any subsequent AU that is a CVSS AU.
  coded video sequence start (CVSS) AU: An AU in which there is a PU for each layer in the CVS and the coded picture in each PU is a Coded Layer Video Sequence Start (CLVSS) picture.
  gradual decoding refresh (GDR) AU: An AU in which the coded picture in each present PU is a GDR picture.
  gradual decoding refresh (GDR) PU: A PU in which the coded picture is a GDR picture.
  gradual decoding refresh (GDR) picture: A picture for which each VCL NAL unit has nal_unit_type equal to GDR_NUT.
  instantaneous decoding refresh (IDR) PU: A PU in which the coded picture is an IDR picture.
  instantaneous decoding refresh (IDR) picture: An IRAP picture for which each VCL NAL unit has nal_unit_type equal to IDR_W_RADL or IDR_N_LP.
  intra random access point (IRAP) AU: An AU in which there is a PU for each layer in the CVS and the coded picture in each PU is an IRAP picture.
  intra random access point (IRAP) PU: A PU in which the coded picture is an IRAP picture.
  intra random access point (IRAP) picture: A coded picture for which all VCL NAL units have the same value of nal_unit_type in the range of IDR_W_RADL to CRA_NUT, inclusive.
  leading picture: A picture that is in the same layer as the associated IRAP picture and precedes the associated IRAP picture in output order.
  random access decodable leading (RADL) PU: A PU in which the coded picture is a RADL picture.
  random access decodable leading (RADL) picture: A picture for which each VCL NAL unit has nal_unit_type equal to RADL_NUT.
  random access skipped leading (RASL) PU: A PU in which the coded picture is a RASL picture.
  random access skipped leading (RASL) picture: A picture for which each VCL NAL unit has nal_unit_type equal to RASL_NUT.
  step-wise temporal sublayer access (STSA) PU: A PU in which the coded picture is an STSA picture.
  step-wise temporal sublayer access (STSA) picture: A picture for which each VCL NAL unit has nal_unit_type equal to STSA_NUT.
    NOTE—An STSA picture does not use pictures with the same TemporalId as the STSA picture for inter prediction reference. Pictures following an STSA picture in decoding order with the same TemporalId as the STSA picture do not use pictures prior to the STSA picture in decoding order with the same TemporalId as the STSA picture for inter prediction reference. An STSA picture enables up-switching, at the STSA picture, to the sublayer containing the STSA picture, from the immediately lower sublayer. STSA pictures must have TemporalId greater than 0.
  trailing picture: A non-IRAP picture that follows the associated IRAP picture in output order and is not an STSA picture.
    NOTE—Trailing pictures associated with an IRAP picture also follow the IRAP picture in decoding order. Pictures that follow the associated IRAP picture in output order and precede the associated IRAP picture in decoding order are not allowed.

3.6. NAL Unit Header Syntax and Semantics in VVC

In the latest VVC text (in JVET-Q2001-vE/v15), the NAL unit header syntax and semantics are as follows.

7.3.1.2 NAL Unit Header Syntax

|  | Descriptor |
| --- | --- |
| nal_unit_header( ) { |  |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } |  |

7.4.2.2 NAL Unit Header Semantics forbidden_zero_bit shall be equal to 0.

nuh_reserved_zero_bit shall be equal to 0. The value 1 of nuh_reserved_zero_bit may be specified in the future by ITU-T | ISO/IEC. Decoders shall ignore (i.e. remove from the bitstream and discard) NAL units with nuh_reserved_zero bit equal to 1.

nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use by ITU-T | ISO/SEC.

The value of nuh_layer_id shall be the same for all VCL NAL units of a coded picture. The value of nuh_layer_id of a coded picture or a PU is the value of the nuh_layer_id of the VCL NAL units of the coded picture or the PU.

The value of nuh_layer_id for Access Unit Delimiter (AUD), Picture Header (PH), End Of Sequence (EOS), and Filler Data (FD) NAL units is constrained as follows:

If nal_unit_type is equal to AUD_NUT, nuh_layer_id shall be equal to vps_layer_id[0].

Otherwise, when nal_unit_type is equal to PH_NUT, EOS_NUT, or FD_NUT, nuh_layer_id shall be equal to the nuh_layer_id of associated VCL NAL unit.

NOTE 1—The value of nuh_layer_id of DCI, VPS, and End Of Bitstream (EOB) NAL units is not constrained.

The value of nal_unit_type shall be the same for all pictures of a CVSS AU.

nal_unit_type specifies the NAL unit type, i.e., the type of Raw Byte Sequence Payload (RBSP) data structure contained in the NAL unit as specified in Table 5.

NAL units that have nal_unit_type in the range of UNSPEC_28 . . . UNSPEC_31, inclusive, for which semantics are not specified, shall not affect the decoding process specified in this Specification.

NOTE 2—NAL unit types in the range of UNSPEC_28 . . . UNSPEC_31 may be used as determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the DUs of the bitstream (as specified in Annex C), decoders shall ignore (remove from the bitstream and discard) the contents of all NAL units that use reserved values of nal_unit_type.

NOTE 3—This requirement allows future definition of compatible extensions to this Specification.

TABLE 5

| | | NAL unit type codes and NAL unit type classes | |
| --- | --- | --- | --- |
| nal_unit_type | Name of nal_unit_type | Content of NAL unit and RBSP syntax structure | NAL unit type class |
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture slice_layer_rbsp( ) | VCL |
| 8 | IDR_N_LP | | |
| 9 | CRA_NUT | Coded slice of a CRA picture silce_layer_rbsp( ) | VCL |
| 10 | GDR_NUT | Coded slice of a GDR picture slice_layer_rbsp( ) | VCL |
| 11 | RSV_IRAP_11 | Reserved IRAP VCL NAL unit types | VCL |
| 12 | RSV_IRAP_12 | | |

TABLE 5-continued

NAL unit type codes and NAL unit type classes

| nal_unit_type | Name of nal_unit_type | Content of NAL unit and RBSP syntax structure | NAL unit type class |
|---|---|---|---|
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

NOTE 4—A clean random access (CRA) picture may have associated RASL or RADL pictures present in the bitstream.

NOTE 5—An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

The value of nal_unit_type shall be the same for all VCL NAL units of a subpicture. A subpicture is referred to as having the same NAL unit type as the VCL NAL units of the subpicture.

For VCL NAL units of any particular picture, the following applies:

If mixed_nalu_types_in_pic_flag is equal to 0, the value of nal_unit_type shall be the same for all VCL NAL units of a picture, and a picture or a PU is referred to as having the same NAL unit type as the coded slice NAL units of the picture or PU.

Otherwise (mixed_nalu_types_in_pic_flag is equal to 1), the picture shall have at least two subpictures and VCL NAL units of the picture shall have exactly two different nal_unit_type values as follows: the VCL NAL units of at least one subpicture of the picture shall all have a particular value of nal_unit_type equal to STSA_NUT, RADL_NUT, RASL_NUT, IDR_W_RADL, IDR_N_LP, or CRA_NUT, while the VCL NAL units of other subpictures in the picture shall all have a different particular value of nal_unit_type equal to TRAIL_NUT, RADL_NUT, or RASL_NUT.

For a single-layer bitstream, the following constraints apply:

Each picture, other than the first picture in the bitstream in decoding order, is considered to be associated with the previous IRAP picture in decoding order.

When a picture is a leading picture of an IRAP picture, it shall be a RADL or RASL picture.

When a picture is a trailing picture of an IRAP picture, it shall not be a RADL or RASL picture.

No RASL pictures shall be present in the bitstream that are associated with an IDR picture.

No RADL pictures shall be present in the bitstream that are associated with an IDR picture having nal_unit_type equal to IDR_N_LP.

NOTE 6—It is possible to perform random access at the position of an IRAP PU by discarding all PUs before the IRAP PU (and to correctly decode the IRAP picture and all the subsequent non-RASL pictures in decoding order), provided each parameter set is available (either in the bitstream or by external means not specified in this Specification) when it is referenced.

Any picture that precedes an IRAP picture in decoding order shall precede the IRAP picture in output order and shall precede any RADL picture associated with the IRAP picture in output order.

Any RASL picture associated with a CRA picture shall precede any RADL picture associated with the CRA picture in output order.

Any RASL picture associated with a CRA picture shall follow, in output order, any IRAP picture that precedes the CRA picture in decoding order.

If field_seq_flag is equal to 0 and the current picture is a leading picture associated with an IRAP picture, it shall precede, in decoding order, all non-leading pictures that are associated with the same IRAP picture. Otherwise, let picA and picB be the first and the last leading pictures, in decoding order, associated with an IRAP picture, respectively, there shall be at most one non-leading picture preceding picA in decoding order, and there shall be no non-leading picture between picA and picB in decoding order.

nuh_temporal_id_plus1 minus 1 specifies a temporal identifier for the NAL unit.

The value of nuh_temporal_id_plus1 shall not be equal to 0.

The variable TemporalId is derived as follows:

TemporalId=nuh_temporal_id_plus1−1 (36)

When nal_unit_type is in the range of IDR_W_RADL to RSV_IRAP_12, inclusive, TemporalId shall be equal to 0.

When nal_unit_type is equal to STSA_NUT and vps_independent_layer_flag[GeneralLayerIdx[nuh_layer_id]] is equal to 1, TemporalId shall not be equal to 0.

The value of TemporalId shall be the same for all VCL NAL units of an AU. The value of TemporalId of a coded picture, a PU, or an AU is the value of the TemporalId of the VCL NAL units of the coded picture, PU, or AU. The value of TemporalId of a sublayer representation is the greatest value of TemporalId of all VCL NAL units in the sublayer representation.

The value of TemporalId for non-VCL NAL units is constrained as follows:
- If nal_unit_type is equal to DCI_NUT, VPS_NUT, or SPS_NUT, TemporalId shall be equal to 0 and the TemporalId of the AU containing the NAL unit shall be equal to 0.
- Otherwise, if nal_unit_type is equal to PH_NUT, TemporalId shall be equal to the TemporalId of the PU containing the NAL unit.
- Otherwise, if nal_unit_type is equal to EOS_NUT or EOB_NUT, TemporalId shall be equal to 0.
- Otherwise, if nal_unit_type is equal to AUD_NUT, FD_NUT, PREFIX_SEI_NUT, or SUFFIX_SEI_NUT, TemporalId shall be equal to the TemporalId of the AU containing the NAL unit.
- Otherwise, when nal_unit_type is equal to PPS_NUT, PREFIX_APS_NUT, or SUFFIX_APS_NUT, TemporalId shall be greater than or equal to the TemporalId of the PU containing the NAL unit.
  NOTE 7—When the NAL unit is a non-VCL NAL unit, the value of TemporalId is equal to the minimum value of the TemporalId values of all AUs to which the non-VCL NAL unit applies. When nal_unit_type is equal to PPS_NUT, PREFIX_APS_NUT, or SUFFIX_APS_NUT, TemporalId may be greater than or equal to the TemporalId of the containing AU, as all PPSs and APSs may be included in the beginning of the bitstream (e.g., when they are transported out-of-band, and the receiver places them at the beginning of the bitstream), wherein the first coded picture has TemporalId equal to 0.

3.7. Picture Header Structure Syntax and Semantics in VVC

In the latest VVC text (in JVET-Q2001-vE/v15), the picture header structure syntax and semantics that are most relevant to the examples described herein are as follows:

7.3.2.7 Picture Header Structure Syntax

| | Descriptor |
|---|---|
| picture_header_structure( ) { | |
|   gdr_or_irap_pic_flag | u(1) |
|   if( gdr_or_irap_pic_flag ) | |

| | Descriptor |
|---|---|
|     gdr_pic_flag | u(1) |
| ... | |
|   ph_pic_order_cnt_lsb | u(v) |
|   if( gdr_or_irap_pic_flag ) | |
|     no_output_of_prior_pics_flag | u(1) |
|   if( gdr_pic_flag ) | |
|     recovery_poc_cnt | ue(v) |
| ... | ue(v) |
| } | |

7.4.3.7 Picture Header Structure Semantics

The PH syntax structure contains information that is common for all slices of the coded picture associated with the PH syntax structure.

gdr_or_irap_pic_flag equal to 1 specifies that the current picture is a GDR or IRAP picture. gdr_or_irap_pic_flag equal to 0 specifies that the current picture may or may not be a GDR or IRAP picture.

gdr_pic_flag equal to 1 specifies the picture associated with the PH is a GDR picture. gdr_pic_flag equal to 0 specifies that the picture associated with the PH is not a GDR picture. When not present, the value of gdr_pic_flag is inferred to be equal to 0. When gdr_enabled_flag is equal to 0, the value of gdr_pic_flag shall be equal to 0.

NOTE 1—When gdr_or_irap_pic_flag is equal to 1 and gdr_pic_flag is equal to 0, the picture associated with the PH is an IRAP picture.

ph_pic_order_cnt_lsb specifies the picture order count modulo MaxPicOrderCntLsb for the current picture. The length of the ph_pic_order_cnt_lsb syntax element is log2_max_pic_order_cnt_lsb_minus4+4 bits. The value of the ph_pic_order_cnt_lsb shall be in the range of 0 to MaxPicOrderCntLsb−1, inclusive.

no_output_of_prior_pics_flag affects the output of previously-decoded pictures in the DPB after the decoding of a CLVSS picture that is not the first picture in the bitstream as specified in Annex C.

recovery_poc_cnt specifies the recovery point of decoded pictures in output order. If the current picture is a GDR picture that is associated with the PH, and there is a picture picA that follows the current GDR picture in decoding order in the Coded Layer Video Sequence (CLVS) that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb−1, inclusive.

When the current picture is a GDR picture, the variable RpPicOrderCntVal is derived as follows:

RpPicOrderCntVal=PicOrderCntVal+recovery_poc_cnt (81)

NOTE 2—When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous IRAP picture, when present, preceding the associated GDR picture in decoding order.

3.8. Constraints on RPLs in VVC

In the latest VVC text (in JVET-Q2001-vE/v15), the constraints on RPLs in VVC are as follows (as part of VVC's clause 8.3.2 Decoding process for reference picture lists construction).

8.3.2 Decoding Process for Reference Picture Lists Construction

For each i equal to 0 or 1, the first NumRefIdxActive[i] entries in RefPicList[i] are referred to as the active entries in RefPicList[i], and the other entries in RefPicList[i] are referred to as the inactive entries in RefPicList[i].

NOTE 2—It is possible that a particular picture is referred to by both an entry in RefPicList[0] and an entry in RefPicList[1]. It is also possible that a particular picture is referred to by more than one entry in RefPicList[0] or by more than one entry in RefPicList[1].

NOTE 3—The active entries in RefPicList[0] and the active entries in RefPicList[1] collectively refer to all reference pictures that may be used for inter prediction of the current picture and one or more pictures that follow the current picture in decoding order. The inactive entries in RefPicList[0] and the inactive entries in RefPicList[1] collectively refer to all reference pictures that are not used for inter prediction of the current picture but may be used in inter prediction for one or more pictures that follow the current picture in decoding order.

NOTE 4—There may be one or more entries in RefPicList[0] or RefPicList[1] that are equal to "no reference picture" because the corresponding pictures are not present in the DPB. Each inactive entry in RefPicList[0] or RefPicList[0] that is equal to "no reference picture" should be ignored. An unintentional picture loss should be inferred for each active entry in RefPicList[0] or RefPicList[1] that is equal to "no reference picture".

It is a requirement of bitstream conformance that the following constraints apply:

For each i equal to 0 or 1, num_ref_entries[i][RplsIdx[i]] shall not be less than NumRefIdxActive[i].

The picture referred to by each active entry in RefPicList[0] or RefPicList[1] shall be present in the DPB and shall have TemporalId less than or equal to that of the current picture.

The picture referred to by each entry in RefPicList[0] or RefPicList[1] shall not be the current picture and shall have non reference picture flag equal to 0.

A Short-Term Reference Picture (STRP) entry in RefPicList[0] or RefPicList[1] of a slice of a picture and a Long-Term Reference Picture (LTRP) entry in RefPicList[0] or RefPicList[1] of the same slice or a different slice of the same picture shall not refer to the same picture.

There shall be no LTRP entry in RefPicList[0] or RefPicList[1] for which the difference between the PicOrderCntVal of the current picture and the PicOrderCntVal of the picture referred to by the entry is greater than or equal to $2^{24}$.

Let setOfRefPics be the set of unique pictures referred to by all entries in RefPicList[0] that have the same nuh_layer_id as the current picture and all entries in RefPicList[1] that have the same nuh_layer_id as the current picture. The number of pictures in setOfRefPics shall be less than or equal to MaxDpbSize−1, inclusive, where MaxDpbSize is as specified in clause A.4.2, and setOfRefPics shall be the same for all slices of a picture.

When the current slice has nal_unit_type equal to STSA_NUT, there shall be no active entry in RefPicList[0] or RefPicList[1] that has TemporalId equal to that of the current picture and nuh_layer_id equal to that of the current picture.

When the current picture is a picture that follows, in decoding order, an STSA picture that has TemporalId equal to that of the current picture and nuh_layer_id equal to that of the current picture, there shall be no picture that precedes the STSA picture in decoding order, has TemporalId equal to that of the current picture, and has nuh_layer_id equal to that of the current picture included as an active entry in RefPicList[0] or RefPicList[1].

When the current picture is a CRA picture, there shall be no picture referred to by an entry in RefPicList[0] or RefPicList[1] that precedes, in output order or decoding order, any preceding IRAP picture in decoding order (when present).

When the current picture is a trailing picture, there shall be no picture referred to by an active entry in RefPicList[0] or RefPicList[1] that was generated by the decoding process for generating unavailable reference pictures for the IRAP picture associated with the current picture.

When the current picture is a trailing picture that follows, in both decoding order and output order, one or more leading pictures associated with the same IRAP picture, if any, there shall be no picture referred to by an entry in RefPicList[0] or RefPicList[1] that was generated by the decoding process for generating unavailable reference pictures for the IRAP picture associated with the current picture.

When the current picture is a recovery point picture or a picture that follows the recovery point picture in output order, there shall be no entry in RefPicList[0] or RefPicList[1] that contains a picture that was generated by the decoding process for generating unavailable reference pictures for the GDR picture of the recovery point picture.

When the current picture is a trailing picture, there shall be no picture referred to by an active entry in RefPicList[0] or RefPicList[1] that precedes the associated IRAP picture in output order or decoding order.

When the current picture is a trailing picture that follows, in both decoding order and output order, one or more leading pictures associated with the same IRAP picture, if any, there shall be no picture referred to by an entry in RefPicList[0] or RefPicList[1] that precedes the associated IRAP picture in output order or decoding order.

When the current picture is a RADL picture, there shall be no active entry in RefPicList[0] or RefPicList[1] that is any of the following:
A RASL picture
A picture that was generated by the decoding process for generating unavailable reference pictures
A picture that precedes the associated IRAP picture in decoding order The picture referred to by each Inter-Layer Reference Picture (ILRP) entry in RefPicList[0] or RefPicList[1] of a slice of the current picture shall be in the same AU as the current picture.

The picture referred to by each ILRP entry in RefPicList[0] or RefPicList[1] of a slice of the current picture shall be present in the DPB and shall have nuh_layer_id less than that of the current picture.

Each ILRP entry in RefPicList[0] or RefPicList[1] of a slice shall be an active entry.

4. TECHNICAL PROBLEMS ADDRESSED BY DISCLOSED TECHNICAL SOLUTIONS

The existing design in the latest VVC text (in JVET-Q2001-vE/v15) has the following problems:
1) The definition of associated IRAP picture should be updated such that the associated IRAP picture of a particular picture belongs to the same layer as the particular picture.
2) The current definition of trailing picture is as follows: trailing picture: A non-IRAP picture that follows the associated IRAP picture in output order and is not an STSA picture.
Accordingly, there needs to be an IRAP picture present in the bitstream for a trailing picture to be present, and if a bitstream does not have an IRAP picture, the NAL unit type value TRAIL_NUT cannot be used. However, non-STSA pictures associated with an GDR picture need to use the NAL unit type value TRAIL_NUT.
3) The existing constraint on the output order of pictures preceding an IRAP picture in decoding order needs to be specified to only apply to pictures within a layer.
4) Constraints on relative decoding order and output order among a GDR picture and picture preceding and succeeding in decoding order are missing.
5) The existing constraint on the decoding order of pictures associated with an IRAP picture and some non-leading pictures needs to be specified to only apply to pictures within a layer.
6) Currently, leading pictures, RADL pictures, and RASL pictures associated with a GDR picture are not supported.
7) The existing constraint on RPLs for a CRA picture needs to be specified to only apply to pictures within a layer.
8) For STSA pictures, trailing pictures associated with GDR pictures, and GDR pictures with NoOutputBeforeRecoveryFlag equal to 0, there lacks a constraint on active entries in the RPLs not to be generated by the decoding process for generating unavailable reference pictures.
9) For STSA pictures, IDR pictures, CRA pictures with NoOutputBeforeRecoveryFlag equal to 0, etc., there lacks a constraint on entries in the RPLs not to be generated by the decoding process for generating unavailable reference pictures.
10) For STSA pictures, there lacks a constraint on active entries in the RPLs not to precede precedes the associated IRAP picture in output order or decoding order.
11) For STSA pictures, there lacks a constraint on entries in the RPLs not to precede precedes the associated IRAP picture in output order or decoding order.

5. EXAMPLES OF EMBODIMENTS AND TECHNICAL SOLUTIONS

To solve the above problems, and others, methods as summarized below are disclosed. The examples described herein should be considered as examples to explain the general concepts and should not be interpreted in a narrow way. Furthermore, these examples can be applied individually or combined in any manner.
1) To solve problem 1, the definition of associated IRAP picture is updated such that the associated IRAP picture of a particular picture belongs to the same layer as the particular picture.
2) To solve problem 2, the definition of trailing picture is updated, such that a trailing picture may also be associated with a GDR picture.
   a. Furthermore, the definition of associated GDR picture is added, and the definition of associated IRAP picture is updated, such that each picture of a layer, except the first picture in the layer in the bitstream, is specified to be associated with the previous IRAP or GDR picture of the same layer in decoding order, whichever is closer.
   b. Furthermore, a constraint is added to require that a trailing picture shall follow the associated IRAP or GDR picture in output order.
3) To solve problem 3, the existing constraint on the output order of pictures preceding an IRAP picture in decoding order is updated such that it only imposes a restriction to pictures within a layer.
   a. In one example, the constraint is specified as follows: Any picture, with nuh_layer_id equal to a particular value layerId, that precedes, in decoding order, an IRAP picture with nuh_layer_id equal to layerId shall precede, in output order, the IRAP picture and all its associated RADL pictures.
4) To solve problem 4, add one or more of the following constraints:
   a. A trailing picture shall follow the associated IRAP or GDR picture in output order.
   b. Any picture, with nuh_layer_id equal to a particular value layerId, that precedes, in decoding order, a GDR picture with nuh_layer_id equal to layerId shall precede, in output order, the GDR picture and all its associated pictures.
5) To solve problem 5, the existing constraint on the decoding order of pictures associated with an IRAP picture and some non-leading pictures is updated such that it only imposes a restriction on pictures within a layer.
   a. In one example, the constraint is specified as follows: If field_seq_flag is equal to 0 and the current picture, with nuh_layer_id equal to a particular value layerId, is a leading picture associated with an IRAP picture, it shall precede, in decoding order, all non-leading pictures that are associated with the same IRAP picture. Otherwise, let picA and picB be the first and the last leading pictures, in decoding order, associated with an IRAP picture, respectively, there shall be at most one non-leading picture with nuh_layer_id equal to layerId preceding picA in decoding order, and there shall be no non-leading picture with nuh_layer_id equal to layerId between picA and picB in decoding order.
   b. In another example, the constraint is specified as follows: If field_seq_flag is equal to 0 and the current picture is a leading picture associated with an IRAP picture, it shall precede, in decoding order, all non-leading pictures that are associated with the same IRAP picture. Otherwise, let picA and picB be the first and the last leading pictures, in decoding order, associated with an IRAP picture, respectively, there shall be at most one non-leading picture associated with the IRAP picture preceding picA in decoding order, and there shall be no non-leading picture associated with the IRAP picture between picA and picB in decoding order.

6) To solve problem 6, leading pictures, RADL pictures, and RASL pictures associated with a GDR picture are defined and specified.
   a. Leading pictures associated with a GDR picture are those pictures that follow the GDR picture in decoding order and precede it in output order.
   b. RADL pictures associated with a GDR picture are the leading pictures associated with the GDR picture and having nal_unit_type equal to RADL_NUT.
   c. RASL pictures associated with a GDR picture are the leading pictures associated with the GDR picture and having nal_unit_type equal to RASL_NUT.

7) To solve problem 7, the existing constraint on RPLs for a CRA picture is updated such that the it only imposes a restriction to pictures within a layer.
   a. In one example, the constraint is specified as follows: When the current picture, with nuh_layer_id equal to a particular value layerId, is a CRA picture, there shall be no picture referred to by an entry in RefPicList[0] or RefPicList[1] that precedes, in output order or decoding order, any preceding IRAP picture with nuh_layer_id equal to layerId in decoding order (when present).

8) To solve problem 8, the following constraint is specified:
   When the current picture, with nuh_layer_id equal to a particular value layerId, is not a RASL picture associated with a CRA picture with NoOutputBeforeRecoveryFlag equal to 1, a GDR picture with NoOutputBeforeRecoveryFlag equal to 1, or a recovering picture of a GDR picture with NoOutputBeforeRecoveryFlag equal to 1 and nuh_layer_id equal to layerId, there shall be no picture referred to by an active entry in RefPicList[0] or RefPicList[1] that was generated by the decoding process for generating unavailable reference pictures.

9) To solve problem 9, the following constraint is specified:
   When the current picture, with nuh_layer_id equal to a particular value layerId, is not a CRA picture with NoOutputBeforeRecoveryFlag equal to 1, a picture that precedes, in decoding order, the leading pictures associated with the same CRA picture with NoOutputBeforeRecoveryFlag equal to 1, a leading picture associated with a CRA picture with NoOutputBeforeRecoveryFlag equal to 1, a GDR picture with NoOutputBeforeRecoveryFlag equal to 1, or a recovering picture of a GDR picture with NoOutputBeforeRecoveryFlag equal to 1 and nuh_layer_id equal to layerId, there shall be no picture referred to by an entry in RefPicList[0] or RefPicList[1] that was generated by the decoding process for generating unavailable reference pictures.

10) To solve problem 10, the following constraint is specified:
    When the current picture is associated with an IRAP picture and follows the IRAP picture in output order, there shall be no picture referred to by an active entry in RefPicList[0] or RefPicList[1] that precedes the associated IRAP picture in output order or decoding order.

11) To solve problem 11, the following constraint is specified:
    When the current picture is associated with an IRAP picture, follows the IRAP picture in output order, and follows, in both decoding order and output order, the leading pictures associated with the same IRAP picture, if any, there shall be no picture referred to by an entry in RefPicList[0] or RefPicList[1] that precedes the associated IRAP picture in output order or decoding order.

6. EMBODIMENTS

Below are some example embodiments for some of the aspects summarized above in Section 5, which can be applied to the VVC specification. The changed texts are based on the latest VVC text in JVET-Q2001-vE/v15. Most relevant parts that have been added or modified are highlighted in *bold italics,*, and some of the deleted parts are marked with double brackets (e.g., [[a]] denotes the deletion of the character "a"). There are some other changes that are editorial in nature and thus not highlighted.

6.1. First Embodiment

This embodiment is for items 1, 2, 3, 4, 5, and 5a.

3 Definitions

*associated GDR picture (of a particular picture with a particular value of nuh_layer_id layerId): The previous GDR picture in decoding order with nuh_layer_id equal to layerId(when present) between which and the particular picture in decoding order there is no IRAP picture with nuh_layer_id equal to layerId.* associated IRAP picture (of a particular picture *with a particular value of nuh_layer_id layerId)*: The previous IRAP picture in decoding order *with nuh_layer_id equal to layerId* (when present) *between which and the* particular picture in decoding order there is no GDR picture with nuh_layer_id equal to layerId.

output order: The order *of pictures or subpictures within a CLVS indicated by increasing Picture Order Count (POC) values, and for decoded pictures that are output output from DPB, this is the order* in which the decoded pictures are output from the DPB.

trailing picture: A picture *for which each VCL NAL unit has nal_unit_type equal to TRAIL_NUT.*
   NOTE—Trailing pictures associated with an IRAP *or GDR* DR picture also follow the IRAP *or GDR* picture in decoding order. Pictures that follow the associated IRAP *or GDR* picture in output order and precede the associated IRAP *or GDR* picture in decoding order are not allowed.

7.4.2.2 NAL Unit Header Semantics

[[For a single-layer bitstream, *It is a requirement of bitstream conformance* of bitstream conformance that the following constraints apply:
   Each picture, other than the first picture in the bitstream in decoding order, is considered to be associated with the previous IRAP picture in decoding order.]]

*A trailing picture shall follow the associated IRAP or GDR picture in output order.*

When a picture is a leading picture of an IRAP picture, it shall be a RADL or RASL picture.

No RASL pictures shall be present in the bitstream that are associated with an IDR picture.

No RADL pictures shall be present in the bitstream that are associated with an IDR picture having nal_unit_type equal to IDR_N_LP.

> NOTE 6—It is possible to perform random access at the position of an IRAP PU by discarding all PUs before the IRAP PU (and to correctly decode the IRAP picture and all the subsequent non-RASL pictures in decoding order), provided each parameter set is available (either in the bitstream or by external means not specified in this Specification) when it is referenced.

Any picture, *with nuh_layer_id equal to a particular value layerId,* that precedes, in decoding order, an IRAP picture *with nuh_layer_id equal to layerId* shall precede, in output order, the IRAP picture and all its associated RADL pictures.

*Any picture, with nuh_layer_id equal to a particular value layerId, that precedes, in decoding order, a GDR picture with nuh_layer_id equal to layerId shall precede, in output order, the GDR picture and all its associated pictures.*

Any RASL picture associated with a CRA picture shall precede any RADL picture associated with the CRA picture in output order.

Any RASL picture associated with a CRA picture shall follow, in output order, any IRAP picture that precedes the CRA picture in decoding order.

If field_seq_flag is equal to 0 and the current picture, *with nuh_layer_id equal to a particular value layerId,* is a leading picture associated with an IRAP picture, it shall precede, in decoding order, all non-leading pictures that are associated with the same IRAP picture. Otherwise, let picA and picB be the first and the last leading pictures, in decoding order, associated with an IRAP picture, respectively, there shall be at most one non-leading picture *with nuh_layer_id equal to layerId* preceding picA in decoding order, and there shall be no non-leading picture *with nuh_layer_id equal to layerId* between picA and picB in decoding order.

7.4.3.7 Picture Header Structure Semantics recovery_poc_cnt specifies the recovery point of decoded pictures in output order.

*When the current picture is a GDR picture, the variable recoveryPointPocVal is derived as follows:* recoveryPointPocVal = PicOrderCntVal + recovery_poc_cnt       (81)

If the current picture is a GDR picture [[that is associated with the PH]], and there is a picture picA that follows the current GDR picture in decoding order in the CLVS that has PicOrderCntVal equal to *recoveryPointPocVal* [[the PicOrderCntVal of the current GDR picture plus the value of recovery_poc_cnt]], the picture picA is referred to as the recovery point picture. Otherwise, the first picture in output order that has PicOrderCntVal greater than *recoveryPointPocVal* [[the PicOrderCntVal of the current picture plus the value of recovery_poc_cnt]] *in the CLVS* is referred to as the recovery point picture. The recovery point picture shall not precede the current GDR picture in decoding order.

*The pictures that are associated with the current GDR picture and have PicOrderCntVal less than recoveryPointPocVal are referred to as the recovering pictures of the GDR picture.* The value of recovery_poc_cnt shall be in the range of 0 to MaxPicOrderCntLsb−1, inclusive.

[[When the current picture is a GDR picture, the variable RpPicOrderCntVal is derived as follows:

RpPicOrderCntVal=PicOrderCntVal+recovery_poc_cnt       (81)]]

> NOTE 2—When gdr_enabled_flag is equal to 1 and PicOrderCntVal of the current picture is greater than or equal to *recoveryPointPocVal* [[RpPicOrderCntVal]] of the associated GDR picture, the current and subsequent decoded pictures in output order are exact match to the corresponding pictures produced by starting the decoding process from the previous IRAP picture, when present, preceding the associated GDR picture in decoding order.

8.3.2 Decoding Process for Reference Picture Lists Construction

It is a requirement of bitstream conformance that the following constraints apply:

When the current picture, *with nuh_layer_id equal to a particular value layerId,* is a CRA picture, there shall be no picture referred to by an entry in RefPicList[0] or RefPicList[1] that precedes, in output order or decoding order, any preceding IRAP picture *with nuh_layer_id equal to layerId* in decoding order (when present).

When the current picture [[is a trailing picture]], *with nuh_layer_id equal to a particular value layerId, is not a RASL picture associated with a CRA picture with NoOutputBeforeRecoveryFlag equal to 1, a GDR picture with NoOutputBeforeRecoveryFlag equal to 1, or a recovering picture of a GDR picture with NoOutputBeforeRecoveryFlag equal to 1 and nuh_layer_id equal to layerId,* there shall be no picture referred to by an active entry in RefPicList[0] or RefPicList[1] that was generated by the decoding process for generating unavailable reference pictures [[for the IRAP picture associated with the current picture]].

When the current picture [[is a trailing picture that follows, in both decoding order and output order, one or more leading pictures associated with the same IRAP picture, if any]], *with nuh_layer_id equal to a particular value layerId, is not a CRA picture with*

*NoOutputBeforeRecoveryFlag
equal to 1, a picture that
precedes, in decoding order, the
leading pictures associated with the same
CRA picture with
NoOutputBeforeRecoveryFlag equal
to 1, a leading picture associated with a CRA
picture with NoOutputBefore
RecoveryFlag equal to 1, a GDR picture with
NoOutputBeforeRecoveryFlag equal
to 1, or a recovering picture of a GDR picture with
NoOutputBeforeRecoveryFlag
equal to 1 and nuh_layer_id equal to layerId,* there
shall be no picture referred to by an entry in RefPicList
[0] or RefPicList[1] that was generated by the decoding
process for generating unavailable reference pictures
[[for the IRAP picture associated with the current
picture]].

[[When the current picture is a recovery point picture or
a picture that follows the recovery point picture in
output order, there shall be no entry in RefPicList[0] or
RefPicList[1] that contains a picture that was generated
by the decoding process for generating unavailable
reference pictures for the GDR picture of the recovery
point picture.]]

When the current picture is [[a trailing picture]]
*associated with an IRAP picture and
follows the IRAP picture in output order*, there
shall be no picture referred to by an active entry in
RefPicList[0] or RefPicList[1] that precedes the associated IRAP picture in output order or decoding order.

When the current picture is [[a trailing picture that ]]
*associated with an IRAP picture, follows the IRAP
picture in output order, and* follows, in both decoding order and output order, the leading pictures associated with the same IRAP picture, if any, there shall be
no picture referred to by an entry in RefPicList[0] or
RefPicList[1] that precedes the associated IRAP picture
in output order or decoding order.

When the current picture is a RADL picture, there shall be
no active entry in RefPicList[0] or RefPicList[1] that is
any of the following:
A RASL picture
[[A picture that was generated by the decoding process for
generating unavailable reference pictures]]
A picture that precedes the associated IRAP picture in
decoding order FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless interfaces such as wireless fidelity (WI-FI) or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 2:
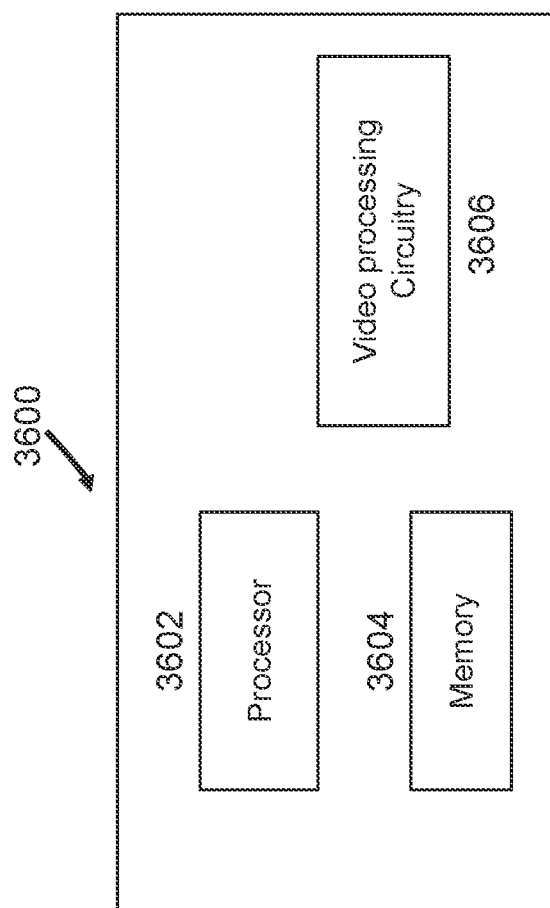
FIG. 2 is a block diagram of an example video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 4:
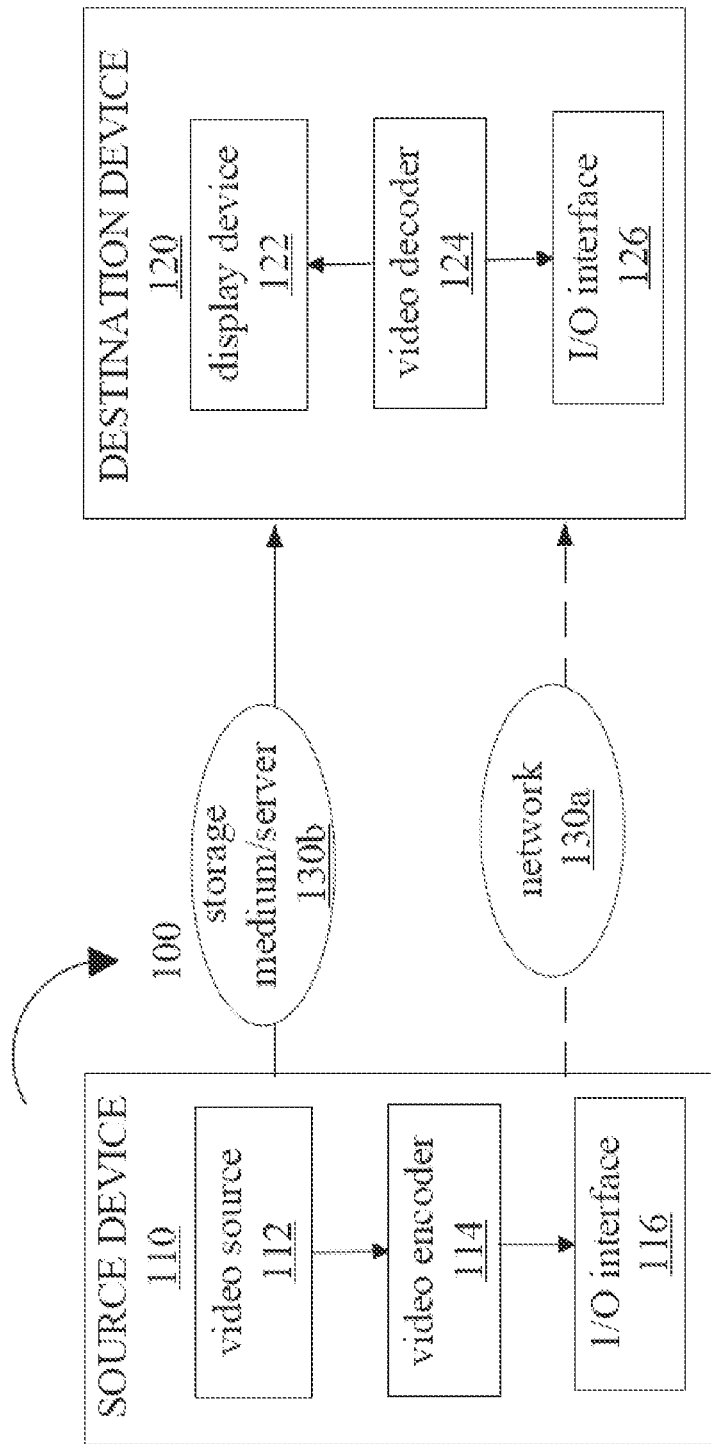
FIG. 4 is a block diagram that illustrates a video coding system, in accordance with various examples.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130*a*. The encoded video data may also be stored onto a storage medium/server 130*b* for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130*b*. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
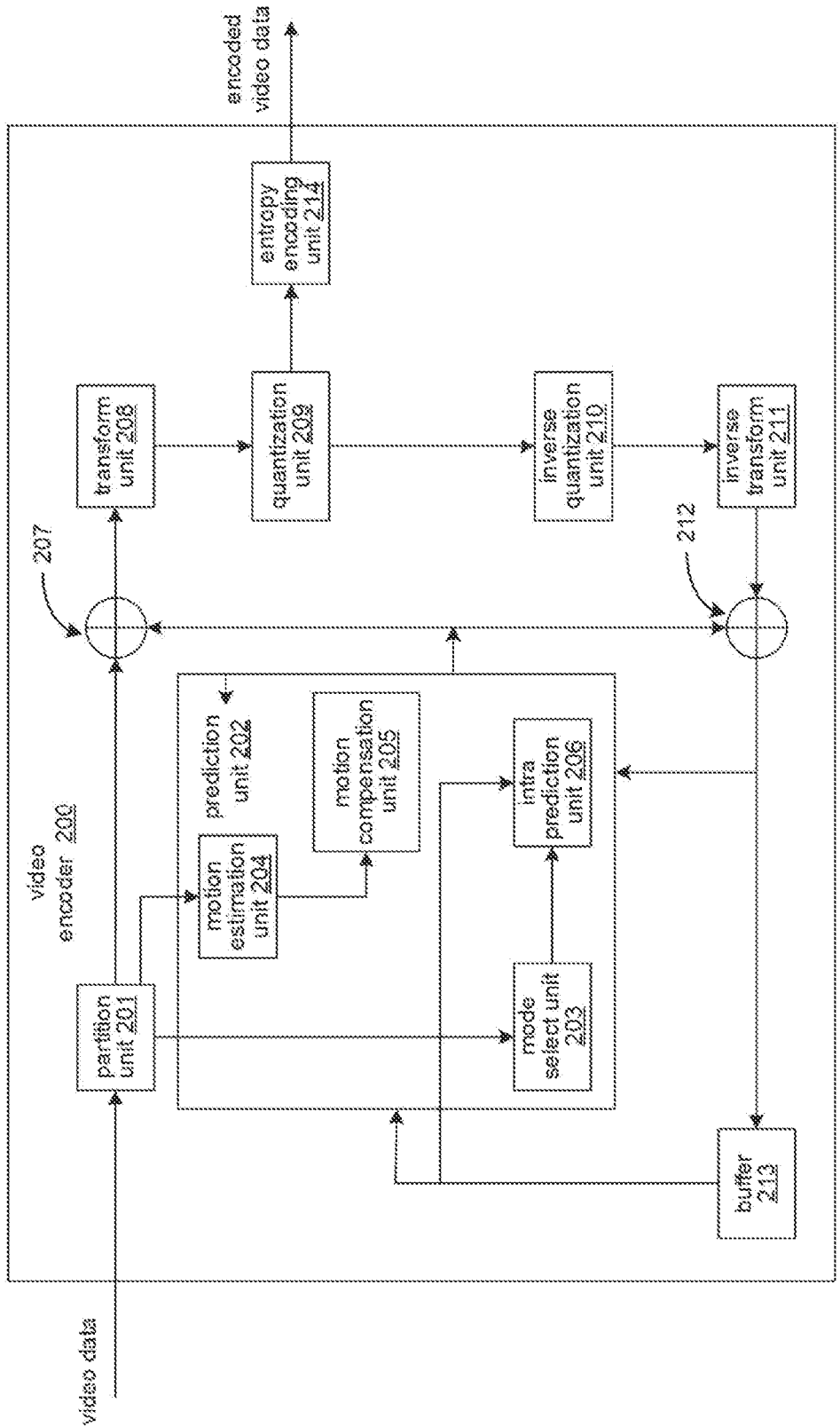
FIG. 5 is a block diagram that illustrates an encoder, in accordance with various examples.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
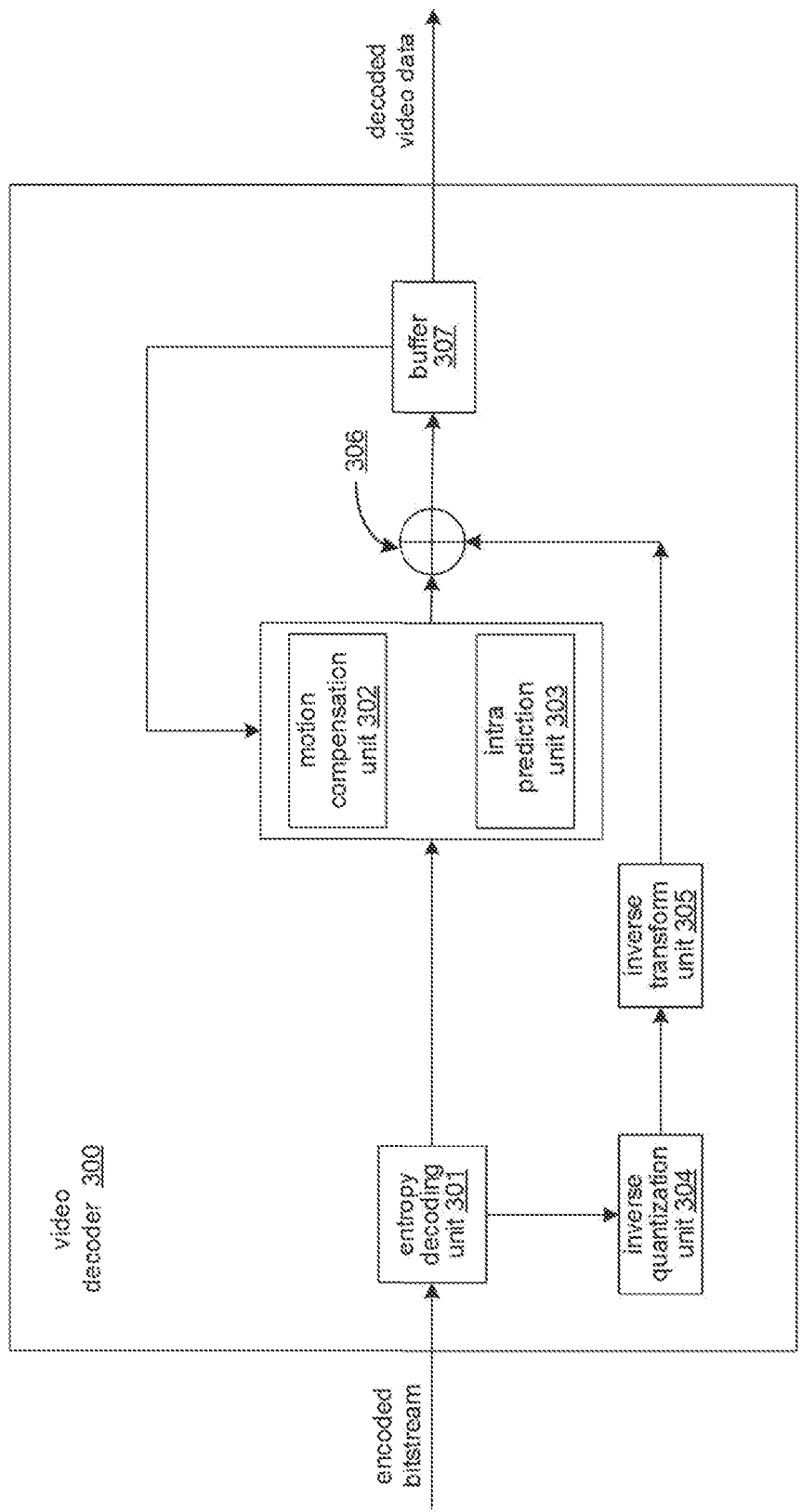
FIG. 6 is a block diagram that illustrates a decoder, in accordance with various examples.

FIG. 6 is a block diagram illustrating an example of video decoder 300 which may be video decoder 124 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transform unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of examples preferred by some embodiments is provided next.

The first set of clauses show example embodiments of techniques discussed in the previous section. The following clauses show example embodiments of techniques discussed in the previous section (e.g., item 1).

Figure 3:
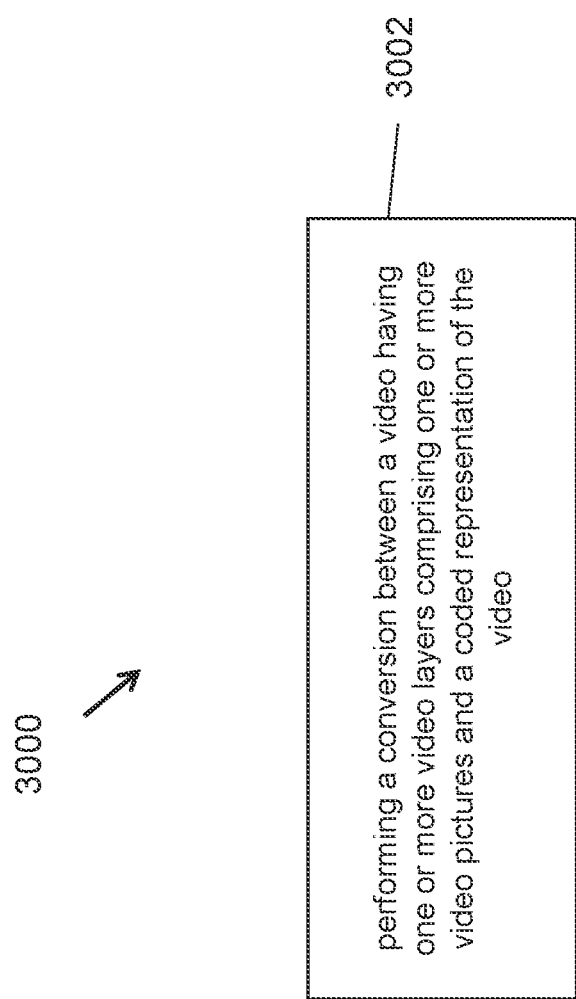
FIG. 3 is a flowchart for an example method of video processing.

1. A video processing method (e.g., method 3000 shown in FIG. 3), comprising: performing (3002) a conversion between a video having one or more video layers comprising one or more video pictures and a coded representation of the video; wherein the coded representation is organized according to a rule that specifies that a first video picture that is an intra random access point picture of a second picture and the second picture are constrained to belong to a same video layer.

The following clauses show example embodiments of techniques discussed in the previous section (e.g., item 2).

2. A video processing method, comprising: performing a conversion between a video having one or more video layers comprising one or more video pictures and a coded representation of the video, wherein the coded representation conforms to a format rule that specifies that a trailing picture in the coded representation following a first type of picture that is an intra random access point is also permitted to be associated with a second type of picture that includes a gradual decoding refresh picture.

3. The method of clause 2, wherein the format rule further specifies that, for each layer, each picture of the layer, except the first picture in the layer in the bitstream, is specified to be associated with a closer one of a previous intra random access point or a gradual decoder refresh picture of the same layer in decoding order.

The following clauses show example embodiments of techniques discussed in the previous section (e.g., item 3).

4. A video processing method, comprising: performing a conversion between a video having one or more video layers comprising one or more video pictures and a coded representation of the video, wherein the coded representation conforms to a format rule that specifies a constraint for an output order of pictures preceding an intra random access point are is in a decoding order such that the output order is applicable only to pictures in a same video layer.

5. The method of clause 1, wherein the constraint specifies that any picture, with a nuh_layer_id equal to a particular value layerId, that precedes, in a decoding order, an intra random access point picture with nuh_layer_id equal to layerId is required to precede, in an output order, the intra random access point picture and all associated random access decodable leading pictures.

The following clauses show example embodiments of techniques discussed in the previous section (e.g., item 4).

6. A video processing method, comprising: performing a conversion between a video having one or more video layers comprising one or more video pictures and a coded representation of the video, wherein the coded representation conforms to a format rule that specifies a constraint that (1) a trailing picture must follow an associated intra random access point picture (IRAP) or a gradual decoder refresh (GDR) picture in an output order, or (2) a picture having a same layer id as that of the GDR picture must precede, in the output order, the GDR picture and all associated pictures of the GDR picture.

The following clauses show example embodiments of techniques discussed in the previous section (e.g., item 5).

7. A video processing method, comprising: performing a conversion between a video having one or more video layers comprising one or more video pictures and a coded representation of the video, wherein the conversion conforms to a rule that an order constraint is applicable to a picture, an intra random access point (IRAP) picture and a non-leading picture if and only if the picture, the IRAP picture and the non-leading picture are in a same layer, wherein the rule is one of:

(a) a first rule specifying a value of a field sequence and a decoding order, or (b) an order of leading and/or non-leading pictures of a layer.

The following clauses show example embodiments of techniques discussed in the previous section (e.g., item 6).

8. A video processing method, comprising: performing a conversion between a video having one or more video layers comprising one or more video pictures and a coded representation of the video, wherein the conversion conforms to a rule that specifies an order of a leading picture, a random access decodable leading (RADL) picture and a random access skipped leading (RASL) picture associated with a gradual decoding refresh (GDR) picture.

The following clauses show example embodiments of techniques discussed in the previous section (e.g., item 7).

9. A video processing method, comprising: performing a conversion between a video having one or more video layers comprising one or more video pictures and a coded representation of the video, wherein the conversion conforms to a rule that specifies that a constraint for a reference picture list for a clean random access picture is limited to a layer.

10. The method of clause 9, wherein the constraint specifies that, for a layer having the clean random access picture, a preceding intra random access point picture in a decoding or an output order are not referred to by an entry in the reference picture list.

The following clauses show example embodiments of techniques discussed in the previous section (e.g., item 8).

11. A video processing method, comprising: performing a conversion between a video having one or more video layers comprising one or more video pictures and a coded representation of the video, wherein the conversion conforms to a rule that specifies a condition under which a current picture is allowed to refer to an entry in a reference picture list that was generated by a decoding process for generating an unavailable reference picture.

12. The method of clause 11, wherein the condition is that the current picture is a random access skipped leading, RASL, picture associated with a clean random access, CRA, picture with NoOutputBeforeRecoveryFlag equal to 1, a gradual decoder refresh, GDR, picture with NoOutputBeforeRecoveryFlag equal to 1, or a recovering picture of a GDR picture with NoOutputBeforeRecoveryFlag equal to 1.

The following clauses show example embodiments of techniques discussed in the previous section (e.g., item 9, 10, 11).

13. A video processing method, comprising: performing a conversion between a video having one or more video layers comprising one or more video pictures and a coded representation of the video, wherein the conversion conforms to a rule of order between a current picture and a reference picture list corresponding to the current picture.

14. The method of clause 13, wherein the rule specifies that when a current picture, with nuh_layer_id equal to a particular value layerId, is not a clean random access (CRA) picture with NoOutputBeforeRecoveryFlag equal to 1, a picture that precedes, in decoding order, the leading pictures associated with the same CRA picture with NoOutputBeforeRecoveryFlag equal to 1, a leading picture associated with a CRA picture with NoOutputBeforeRecoveryFlag equal to 1, a gradual decoder refresh, GDR, picture with NoOutputBeforeRecoveryFlag equal to 1, or a recovering picture of a GDR picture with NoOutputBeforeRecoveryFlag equal to 1 and nuh_layer_id equal to layerId, there shall be no picture referred to by an entry in RefPicList[0] or RefPicList[1] that was generated by the decoding process for generating unavailable reference pictures.

15. The method of clause 13, wherein the rule specifies that when the current picture is associated with an intra random access point, IRAP, picture and follows the IRAP picture in output order, there shall be no picture referred to by an active entry in RefPicList[0] or RefPicList[1] that precedes the associated IRAP picture in output order or decoding order.

16. The method of clause 13, wherein the rule specifies that, when the current picture is associated with an intra random access point, IRAP, picture, follows the IRAP picture in output order, and follows, in both decoding order and output order, the leading pictures associated with the same IRAP picture, if any, there shall be no picture referred to by an entry in RefPicList[0] or RefPicList[1] that precedes the associated IRAP picture in output order or decoding order.

17. The method of any of clauses 1 to 16, wherein the conversion comprises encoding the video into the coded representation.

18. The method of any of clauses 1 to 16, wherein the conversion comprises decoding the coded representation to generate pixel values of the video.

19. A video decoding apparatus comprising a processor configured to implement a method recited in one or more of clauses 1 to 18.

20. A video encoding apparatus comprising a processor configured to implement a method recited in one or more of clauses 1 to 18.

21. A computer program product having computer code stored thereon, the code, when executed by a processor, causes the processor to implement a method recited in any of clauses 1 to 18.

22. A method, apparatus or system described in the present document.

The second set of clauses show example embodiments of techniques discussed in the previous section (e.g., items 1-7).

Figure 7A:
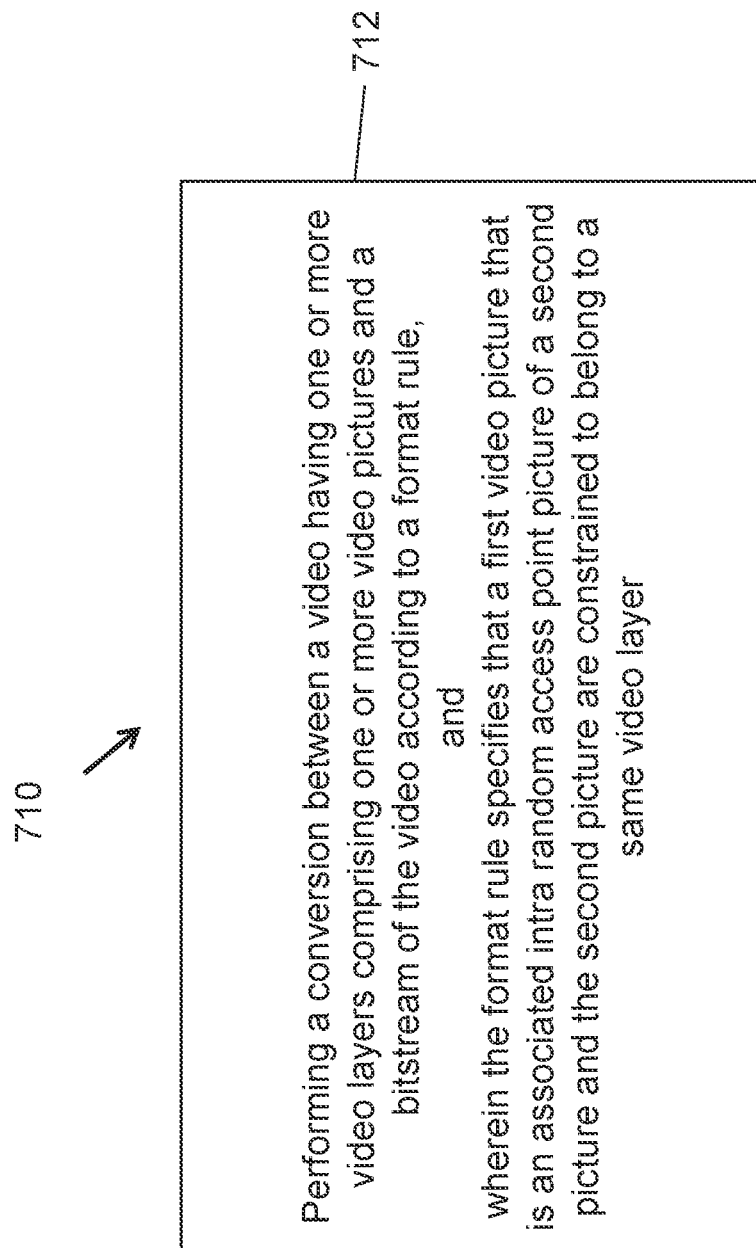

1. A method of video processing (e.g., method 710 as shown in FIG. 7A), comprising: performing 712 a conversion between a video having one or more video layers comprising one or more video pictures and a bitstream of the video according to a format rule, and wherein the format rule specifies that a first video picture that is an associated intra random access point picture of a second picture and the second picture are constrained to belong to a same video layer.

2. The method of clause 1, wherein, between the first video picture and the second picture in decoding order, there is no gradual decoding refresh picture in the same video layer.

3. The method of clause 1, wherein the first video picture and the second picture have a same identifier of a layer to which a video coding layer network abstraction layer unit belongs or a same identifier of a layer to which a non-video coding layer network abstraction layer unit applies.

4. The method of any of clauses 1-3, wherein, between the first video picture and the second picture in decoding order, there is no gradual decoding refresh picture with the same identifier.

5. The method of clause 1, wherein the format rule further specifies that a trailing picture follows an associated intra random access point picture or a gradual decoding refresh picture in an output order.

Figure 7B:
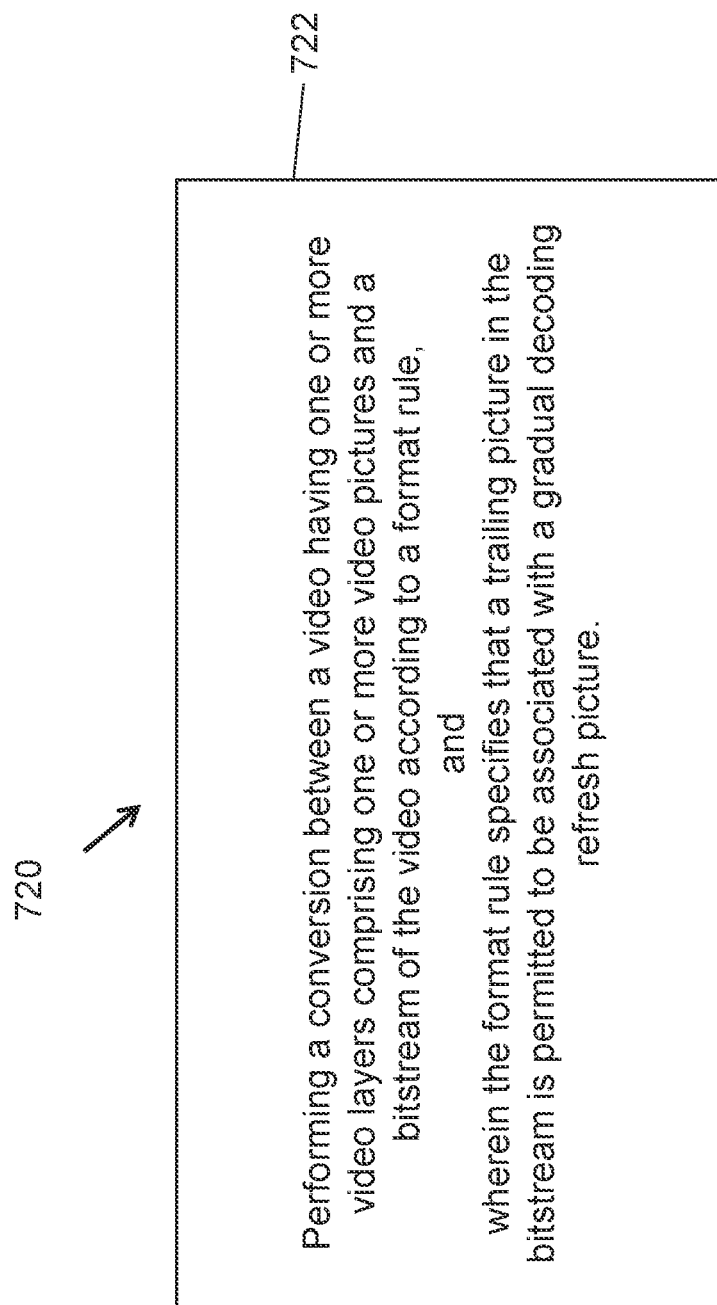

6. A method of video processing (e.g., method 720 as shown in FIG. 7B), comprising: performing 722 a conversion between a video having one or more video layers comprising one or more video pictures and a bitstream of the video according to a format rule, and wherein the format rule specifies that a trailing picture in the bitstream is permitted to be associated with a gradual decoding refresh picture.

7. The method of clause 6, wherein the trailing picture is a picture for which each video coding layer network abstraction layer unit has a trail network abstraction layer unit type.

8. The method of clause 6 or 7, wherein the trailing picture is permitted to be associated with an intra random access point picture.

9. The method of any of clauses 6-8, wherein the trailing picture associated with an intra random access point picture or a gradual decoding refresh picture follows the intra random access point picture or the gradual decoding refresh picture in decoding order.

10. The method any of clauses 6-8, wherein pictures that follow the associated intra random access point picture in output order and precede the associated intra random access point picture in decoding order are not allowed.

11. The method of clause 6, wherein the format rule further specifies that, for each layer, each picture of the layer, except the first picture in the layer in the bitstream, is specified to be associated with a closer one of a previous intra random access point or a gradual decoder refresh picture of the same layer in decoding order.

12. The method of clause 6 or 11, wherein the trailing picture is required to follow the associated intra random access point or gradual decoder refresh picture in output order.

Figure 7C:
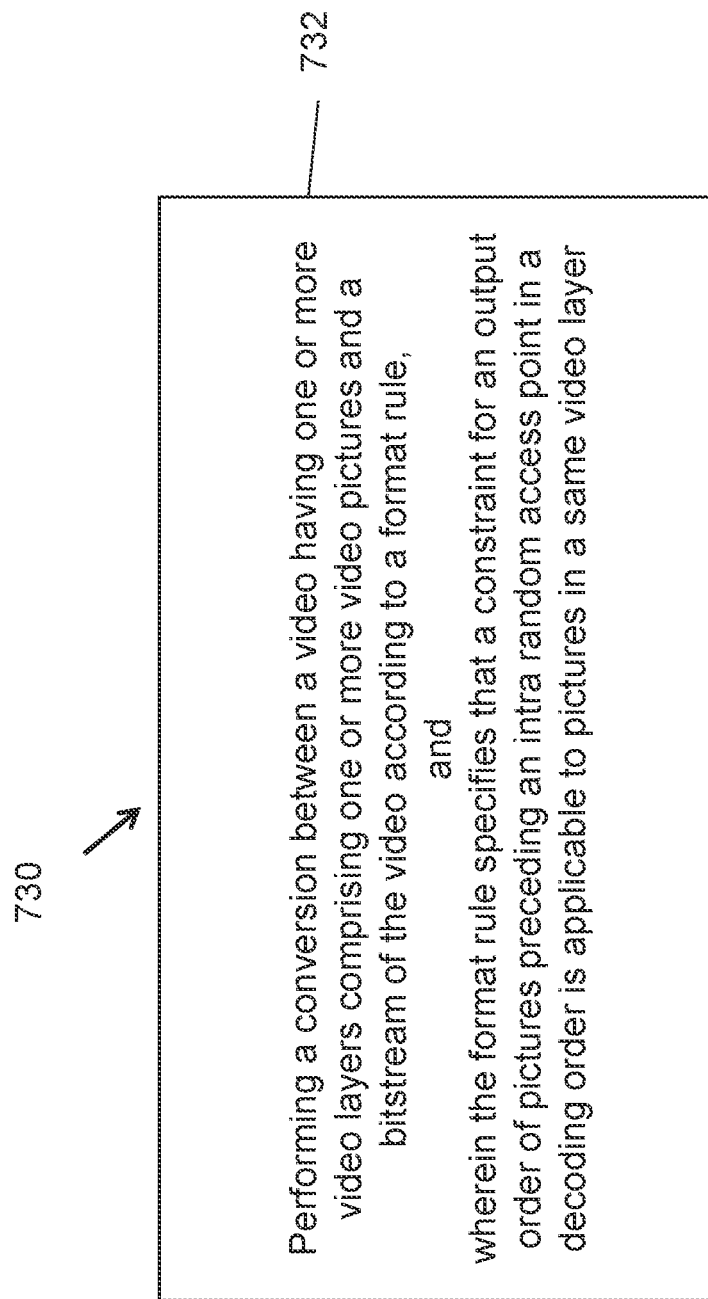

13. A method of video processing (e.g., method 730 as shown in FIG. 7C), comprising: performing 732 a conversion between a video having one or more video layers comprising one or more video pictures and a bitstream of the video according to a format rule, and wherein the format rule specifies that a constraint for an output order of pictures preceding an intra random access point in a decoding order is applicable to pictures in a same video layer.

14. The method of clause 13, wherein the constraint specifies that any picture having a network abstraction layer (NAL) unit header layer identifier equal to a particular value and preceding, in a decoding order, an intra random access point picture with the NAL unit header layer identifier equal to the particular value is required to precede, in an output order, the intra random access point picture and all associated random access decodable leading pictures.

15. The method of clause 14, wherein the network abstraction layer (NAL) unit header layer identifier is nuh_layer_id.

16. The method of clause 14, wherein the network abstraction layer (NAL) unit header layer identifier specifies the identifier of a layer to which a video coding layer network abstraction layer unit belongs or the identifier of a layer to which a non-video coding layer network abstraction layer unit applies.

17. A method of video processing (e.g., method 740 as shown in FIG. 7D), comprising: performing 742 a conversion between a video having one or more video layers comprising one or more video pictures and a bitstream of the video according to a format rule, and wherein the format rule specifies a constraint that (1) a trailing picture follows an associated intra random access point picture or a gradual decoder refresh picture in an output order, or (2) a picture having a same network abstraction layer (NAL) unit header layer identifier as that of the gradual decoder refresh picture precedes, in the output order, the gradual decoder refresh picture and all associated pictures of the gradual decoder refresh picture.

18. A method of video processing (e.g., method 750 as shown in FIG. 7E), comprising: performing 752 a conversion between a video having one or more video layers comprising one or more video pictures and a bitstream of the video according to a rule, and wherein the rule specifies to apply a constraint on a decoding order of a picture associated with an intra random access point picture and a non-leading picture if and only if the picture, the intra random access point picture and the non-leading picture are in a same layer.

19. The method of clause 18, wherein the constraint specifies that in case that a value of a field sequence flag is equal to 0 and the picture with a network abstraction layer (NAL) unit header layer identifier equal to a particular value is a leading picture associated with the intra random access point picture, the picture precedes, in the decoding order, all non-leading pictures that are associated with the intra random access point picture.

20. The method of clause 19, wherein the value of the field sequence flag that is equal to 0 indicates that a coded layer video sequence conveys pictures that represent frames.

21. The method of clause 18, wherein the constraint specifies that in case that a value of a field sequence flag is equal to 0 and the picture is a leading picture associated with the intra random access point picture, the picture precedes, in the decoding order, all non-leading pictures that are associated with the intra random access point picture.

Figure 7F:

22. A method of video processing (e.g., method 760 as shown in FIG. 7F), comprising: performing 762 a conversion between a video having one or more video layers comprising one or more video pictures and a bitstream of the video according to a rule, and wherein the rule specifies an order of a leading picture, a random access decodable leading picture and a random access skipped leading picture associated with a gradual decoding refresh picture.

23. The method of clause 22, wherein the leading picture associated with the gradual decoding refresh picture follows the gradual decoding refresh picture in decoding order and precedes the gradual decoding refresh picture in output order.

24. The method of clause 22, wherein the random access decodable leading pictures associated with the gradual decoding refresh picture is the leading picture associated with the gradual decoding refresh picture and has a network abstraction layer (NAL) unit type corresponding to a coded slice of the random access decodable leading picture.

25. The method of clause 22, wherein the random access decodable leading picture associated with the gradual decoding refresh picture is the leading picture associated with the gradual decoding refresh picture and has a network abstraction layer (NAL) unit type corresponding to a coded slice of the random access decodable leading picture.

Figure 7G:
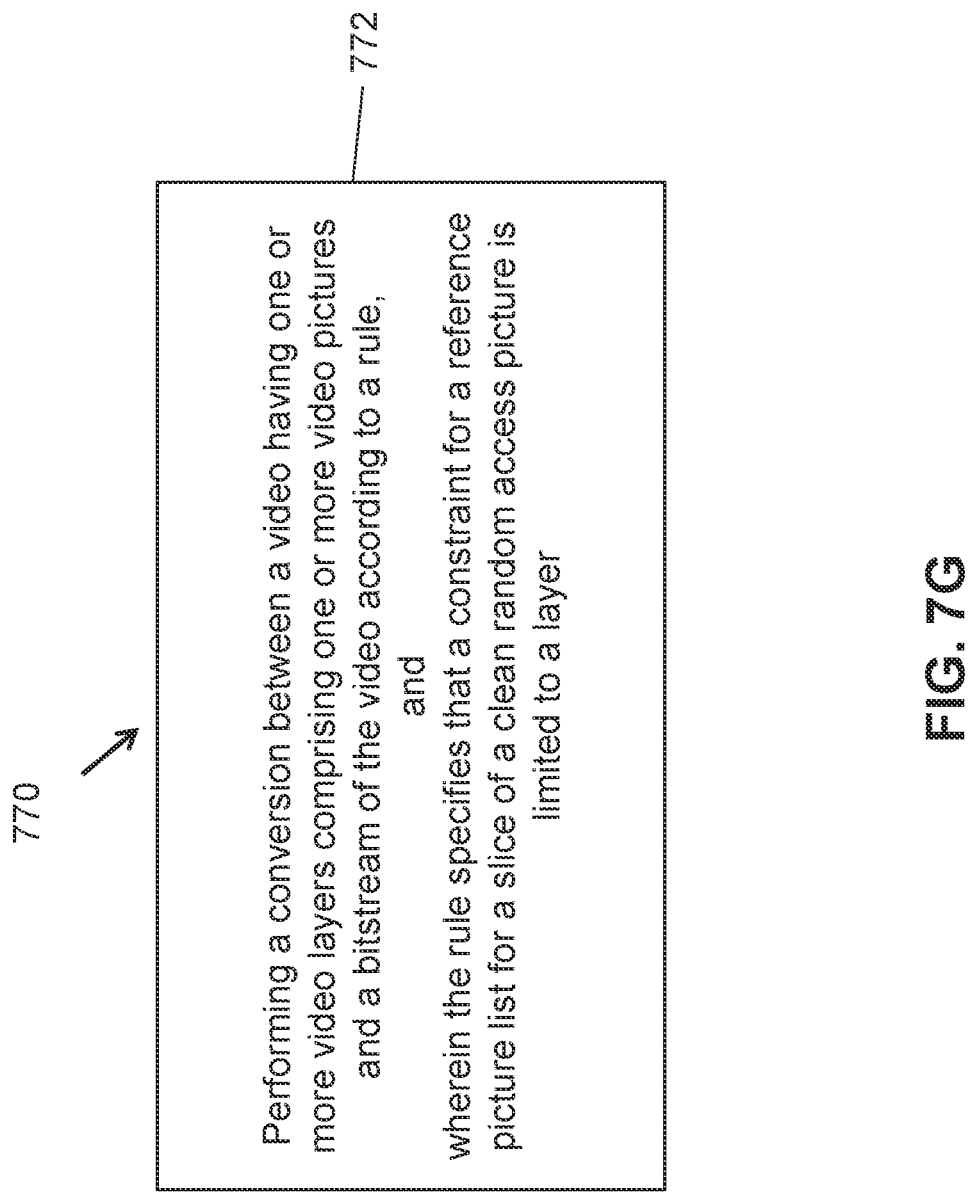

26. A method of video processing (e.g., method 770 as shown in FIG. 7G), comprising: performing 772 a conversion between a video having one or more video layers comprising one or more video pictures and a bitstream of the video according to a rule, wherein the rule specifies that a constraint for a reference picture list for a slice of a clean random access picture is limited to a layer.

27. The method of clause 26, wherein the constraint specifies that, for a layer having the clean random access picture, a preceding intra random access point picture in a decoding or an output order is not referred to by an entry in the reference picture list.

28. The method of any of clauses 1 to 27, wherein the conversion includes encoding the video into the bitstream.

29. The method of any of clauses 1 to 27, wherein the conversion includes decoding the video from the bitstream.

30. The method of clauses 1 to 27, wherein the conversion includes generating the bitstream from the video, and the method further comprises: storing the bitstream in a non-transitory computer-readable recording medium.

31. A video processing apparatus comprising a processor configured to implement a method recited in any one or more of clauses 1 to 30.

32. A method of storing a bitstream of a video, comprising, a method recited in any one of clauses 1 to 30, and further including storing the bitstream to a non-transitory computer-readable recording medium.

33. A computer readable medium storing program code that, when executed, causes a processor to implement a method recited in any one or more of clauses 1 to 30.

34. A computer readable medium that stores a bitstream generated according to any of the above described methods.

35. A video processing apparatus for storing a bitstream representation, wherein the video processing apparatus is configured to implement a method recited in any one or more of clauses 1 to 30.

The third set of clauses show example embodiments of techniques discussed in the previous section (e.g., items 8 and 9).

1. A video processing method (e.g., method 810 as shown in FIG. 8A), comprising: performing 810 a conversion between a video having one or more video layers comprising one or more video pictures and a bitstream of the video according to a rule, and wherein the rule specifies a condition under which no picture that has been generated by a decoding process for generating an unavailable reference picture is referred to by an active entry in a reference picture list of a current slice of a current picture.

2. The method of clause 1, wherein the active entry corresponds to an entry that is available for being used as a reference index in an inter prediction of the current picture.

3. The method of clause 1, wherein the condition is that the current picture with a network abstraction layer (NAL) unit header layer identifier equal to a particular value is not a random access skipped leading picture associated with a clean random access picture with a variable indicating no output before recovery equal to 1, a gradual decoder refresh picture with the variable equal to 1 or a recovering picture of a gradual decoder refresh picture with the variable equal to 1 and the NAL unit header layer identifier equal to the particular value.

Figure 8B:
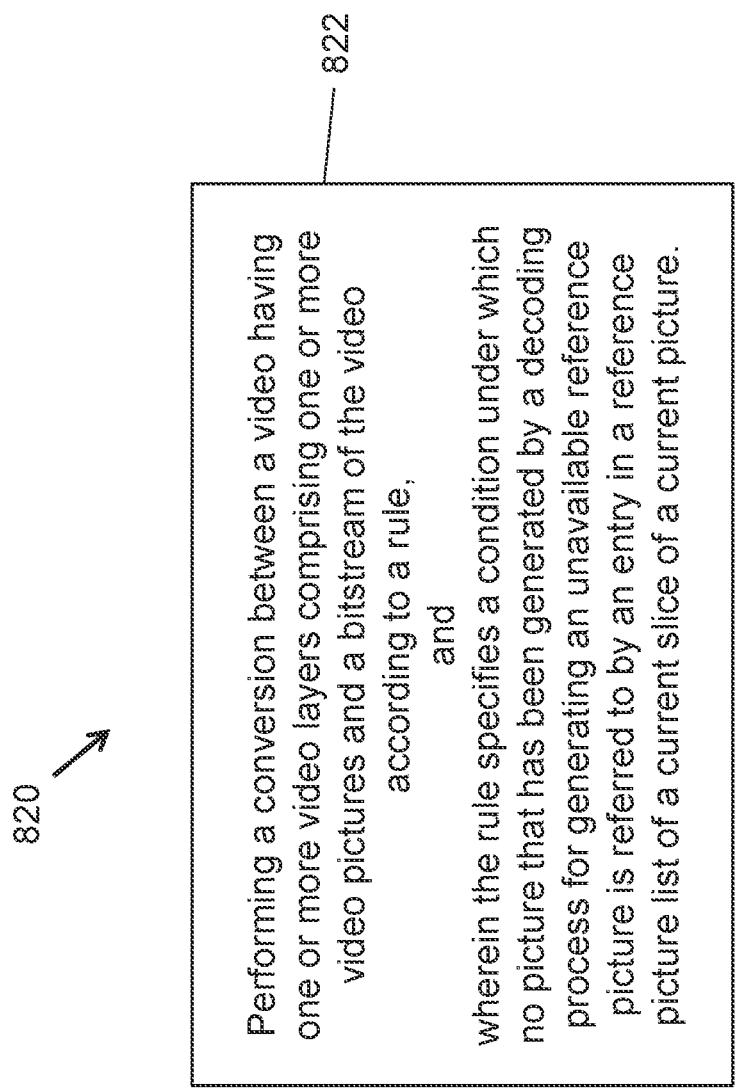

4. A video processing method (e.g., method 820 as shown in FIG. 8B), comprising: performing 822 a conversion between a video having one or more video layers comprising one or more video pictures and a bitstream of the video according to a rule, and wherein the rule specifies a condition under which no picture that has been generated by a decoding process for generating an unavailable reference picture is referred to by an entry in a reference picture list of a current slice of a current picture.

5. The method of clause 4, wherein the condition is that the current picture with a network abstraction layer (NAL) unit header layer identifier equal to a particular value is not a clean random access picture with a variable indicating no output before recovery equal to 1, a picture that precedes, in decoding order, a leading picture associated with the clean random access picture with the variable equal to 1, a gradual decoder refresh picture with the variable equal to 1, or a recovering picture of a gradual decoder refresh picture with the variable equal to 1 and the NAL unit header layer identifier equal to the particular value.

6. The method of any of clauses 1 to 5, wherein the conversion includes encoding the video into the bitstream.

7. The method of any of clauses 1 to 5, wherein the conversion includes decoding the video from the bitstream.

8. The method of any of clauses 1 to 5, wherein the conversion includes generating the bitstream from the video, and the method further comprises: storing the bitstream in a non-transitory computer-readable recording medium.

9. A video processing apparatus comprising a processor configured to implement a method recited in any one or more of clauses 1 to 8.

10. A method of storing a bitstream of a video, comprising, a method recited in any one of clauses 1 to 8, and further including storing the bitstream to a non-transitory computer-readable recording medium.

11. A computer readable medium storing program code that, when executed, causes a processor to implement a method recited in any one or more of clauses 1 to 8.

12. A computer readable medium that stores a bitstream generated according to any of the above described methods.

13. A video processing apparatus for storing a bitstream representation, wherein the video processing apparatus is configured to implement a method recited in any one or more of clauses 1 to 12.

The fourth set of clauses show example embodiments of techniques discussed in the previous section (e.g., items 10 and 11).

1. A method of video processing (e.g., method 910 as shown in FIG. 9A), comprising: performing 912 a conversion between a video having one or more video layers comprising a current picture comprising a current slice and a bitstream of the video according to a rule, and wherein the rule specifies a condition under which a reference picture list for the current slice is disallowed to have an active entry that refers to a picture that precedes, in a decoding order or an output order, an intra random access point picture associated with the current picture.

2. The method of clause 1, wherein the active entry corresponds to an entry that is available for being used as a reference index in an inter prediction of the current picture.

3. The method of clause 1 or 2, wherein the rule specifies the condition under which the reference picture list for the current picture is disallowed to have the active entry that refers to the picture that precedes, in the decoding order, the intra random access point picture associated with the current picture.

4. The method of any of clauses 1 to 3, wherein the rule specifies the condition under which the reference picture list for the current picture is disallowed to have the active entry that refers to the picture that precedes, in the output order, the intra random access point picture associated with the current picture.

5. The method of any of clauses 1 to 4, wherein the condition is that the current picture is associated with the intra random access point picture and follows the intra random access point picture in the decoding order and/or the output order.

6. The method of any of clauses 1 to 4, wherein the condition is that the current picture follows the intra random access point picture having a same value of an identifier of the layer to which a video coding layer network abstraction layer unit belongs or an identifier of a layer to which a non-video coding layer network abstraction layer unit applies in the decoding order and/or the output order.

Figure 9B:
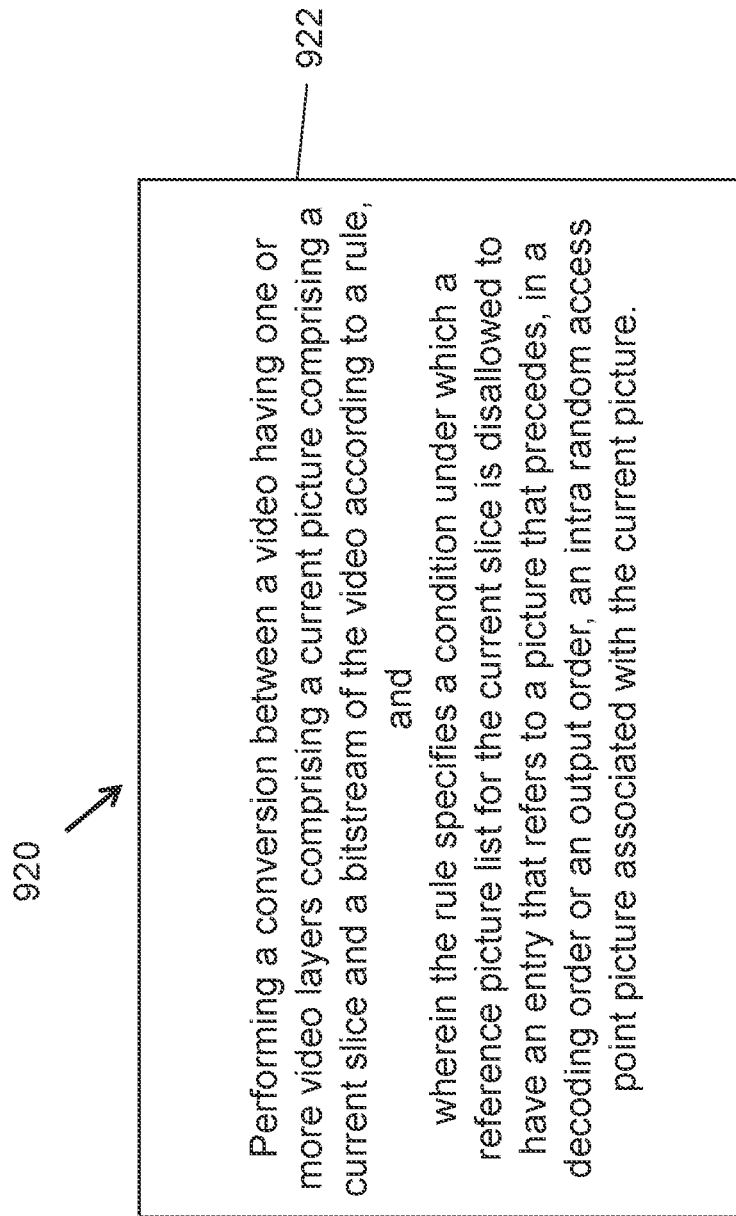

7. A method of video processing (e.g., method 920 as shown in FIG. 9B), comprising: performing 922 a conversion between a video having one or more video layers comprising a current picture comprising a current slice and a bitstream of the video according to a rule, and wherein the rule specifies a condition under which a reference picture list for the current slice is disallowed to have an entry that refers to a picture that precedes, in a decoding order or an output order, an intra random access point picture associated with the current picture.

8. The method of clause 7, wherein the rule specifies the condition under which the reference picture list for the current picture is disallowed to have the entry that refers to the picture that precedes, in the decoding order, the intra random access point picture associated with the current picture.

9. The method of clause 7 or 8, wherein the rule specifies the condition under which the reference picture list for the current picture is disallowed to have the entry that refers to the picture that precedes, in the output order, the intra random access point picture associated with the current picture.

10. The method of any of clauses 7 to 9, wherein the intra random access point picture is associated with zero or more leading pictures, and wherein the condition is that the current picture is associated with the intra random access point picture, follows the intra random access point picture in the decoding order and/or the output order, and follows, in both decoding order and output order, the zero or more leading pictures associated with the intra random access point picture.

11. The method of any of clauses 7 to 9, wherein the intra random access point picture is associated with zero or more leading pictures, and wherein the condition is that the current picture follows the intra random access point picture having a same value of an identifier of the layer to which a video coding layer network abstraction layer unit belongs or an identifier of a layer to which a non-video coding layer network abstraction layer unit applies and the zero or more leading pictures in the decoding order and/or the output order.

12. The method of any of clauses 1 to 11, wherein the conversion includes encoding the video into the bitstream.

13. The method of any of clauses 1 to 11, wherein the conversion includes decoding the video from the bitstream.

14. The method of any of clauses 1 to 11, wherein the conversion includes generating the bitstream from the video, and the method further comprises: storing the bitstream in a non-transitory computer-readable recording medium.

15. A video processing apparatus comprising a processor configured to implement a method recited in any one or more of clauses 1 to 14.

16. A method of storing a bitstream of a video, comprising, a method recited in any one of clauses 1 to 14, and further including storing the bitstream to a non-transitory computer-readable recording medium.

17. A computer readable medium storing program code that, when executed, causes a processor to implement a method recited in any one or more of clauses 1 to 14.

18. A computer readable medium that stores a bitstream generated according to any of the above described methods.

19. A video processing apparatus for storing a bitstream representation, wherein the video processing apparatus is configured to implement a method recited in any one or more of clauses 1 to 14.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
performing a conversion between a video having one or more video layers comprising a current picture comprising a current slice of the current picture and a bitstream of the video according to a first rule, and
wherein the first rule specifies a first condition comprising that when the current picture with a network abstraction layer (NAL) unit header layer identifier equal to a first particular value is not a clean random access picture with a first variable indicating no output before recovery equal to 1, a picture, associated with a clean random access picture with a second variable indicating no output before recovery equal to 1, that precedes, in a decoding order, all leading pictures associated with the clean random access picture with the second variable indicating no output before recovery equal to 1, a leading picture associated with the clean random access picture with the first variable indicating no output before recovery equal to 1, a first gradual decoder refresh picture with a third variable indicating no output before recovery equal to 1, or a recovering picture of a second gradual decoder refresh picture with a fourth variable indicating no output before recovery equal to 1 and the NAL unit header layer identifier equal to the first particular value, no picture that has been generated by a decoding process for generating an unavailable reference picture is referred to by an entry in a reference picture list of the current slice of the current picture.

2. The method of claim 1, wherein the first rule specifies that under a second condition that the current picture is any picture that follows an intra random access point picture having a same value of an identifier of a layer to which a video coding layer network abstraction layer unit belongs or an identifier of a layer to which a non-video coding layer network abstraction layer unit applies in both the decoding order and an output order, the reference picture list for the current slice is disallowed to have an active entry that refers to a picture that precedes, in the decoding order or the output order, the intra random access point picture associated with the current picture.

3. The method of claim 2, wherein the active entry corresponds to an entry that is available for being used as a reference index in an inter prediction of the current picture.

4. The method of claim 2, wherein the second condition is that the current picture is associated with the intra random access point picture and follows the intra random access point picture in the decoding order and/or the output order.

5. The method of claim 2, wherein the intra random access point picture is associated with zero or more leading pictures, and wherein the second condition is that the current picture is associated with the intra random access point picture, follows the intra random access point picture in the decoding order and/or the output order, and follows, in both the decoding order and the output order, the zero or more leading pictures associated with the intra random access point picture.

6. The method of claim 2, wherein the intra random access point picture is associated with zero or more leading pictures, and wherein the second condition is that the current picture follows the intra random access point picture having the same value of the identifier of the layer to which the video coding layer network abstraction layer unit belongs or the identifier of the layer to which the non-video coding layer network abstraction layer unit applies and the zero or more leading pictures in both the decoding order and the output order.

7. The method of claim 1, wherein the conversion includes encoding the video into the bitstream.

8. The method of claim 1, wherein the conversion includes decoding the video from the bitstream.

9. The method of claim 1, wherein the conversion is performed according to a second rule; and
wherein the second rule specifies that a constraint for an output order of pictures preceding an intra random access point picture in the decoding order is applicable to pictures in a same video layer.

10. The method of claim 9, wherein the constraint specifies that any picture having an NAL unit header layer identifier equal to a second particular value and preceding, in the decoding order, an intra random access point picture with the NAL unit header layer identifier equal to the second particular value is required to precede, in the output order, the intra random access point picture with the NAL unit header layer identifier equal to the second particular value and any random access decodable leading picture associated with the intra random access point picture with the NAL unit header layer identifier equal to the second particular value.

11. An apparatus for processing video data comprising a processor and a non-transitory memory with instructions thereon, wherein the instructions upon execution by the processor, cause the processor to:
perform a conversion between a video having one or more video layers comprising a current picture comprising a current slice of the current picture and a bitstream of the video according to a first rule, and
wherein the first rule specifies a first condition comprising that when the current picture with a network abstraction layer (NAL) unit header layer identifier equal to a first particular value is not a clean random access picture with a first variable indicating no output before recovery equal to 1, a picture, associated with a clean random access picture with a second variable indicating no output before recovery equal to 1, that precedes, in a decoding order, all leading pictures associated with the clean random access picture with the second variable indicating no output before recovery equal to 1, a leading picture associated with the clean random access picture with the first variable indicating no output before recovery equal to 1, a first gradual decoder refresh picture with a third variable indicating no output before recovery equal to 1, or a recovering picture of a second gradual decoder refresh picture with a fourth variable indicating no output before recovery equal to 1 and the NAL unit header layer identifier equal to the first particular value, no picture that has been generated by a decoding process for generating an unavailable reference picture is referred to by an entry in a reference picture list of the current slice of the current picture.

12. The apparatus of claim 11, wherein the first rule specifies that under a second condition that the current picture is any picture that follows an intra random access point picture having a same value of an identifier of a layer to which a video coding layer network abstraction layer unit belongs or an identifier of a layer to which a non-video coding layer network abstraction layer unit applies in both the decoding order and an output order, the reference picture list for the current slice is disallowed to have an active entry that refers to a picture that precedes, in the decoding order or the output order, the intra random access point picture associated with the current picture.

13. The apparatus of claim 12, wherein the second condition is that the current picture is associated with the intra random access point picture and follows the intra random access point picture in the decoding order and/or the output order.

14. The apparatus of claim 12, wherein the intra random access point picture is associated with zero or more leading pictures, and wherein the second condition is that the current picture is associated with the intra random access point picture, follows the intra random access point picture in the decoding order and/or the output order, and follows, in both the decoding order and the output order, the zero or more leading pictures associated with the intra random access point picture.

15. The apparatus of claim 12, wherein the intra random access point picture is associated with zero or more leading pictures, and wherein the second condition is that the current picture follows the intra random access point picture having the same value of the identifier of the layer to which the video coding layer network abstraction layer unit belongs or the identifier of the layer to which the non-video coding layer network abstraction layer unit applies and the zero or more leading pictures in both the decoding order and the output order.

16. A non-transitory computer-readable storage medium storing instructions that cause a processor to:
perform a conversion between a video having one or more video layers comprising a current picture comprising a current slice of the current picture and a bitstream of the video according to a first rule, and
wherein the first rule specifies a first condition comprising that when the current picture with a network abstraction layer (NAL) unit header layer identifier equal to a first particular value is not a clean random access picture with a first variable indicating no output before recovery equal to 1, a picture, associated with a clean random access picture with a second variable indicating no output before recovery equal to 1, that precedes, in a decoding order, all leading pictures associated with the clean random access picture with the second variable indicating no output before recovery equal to 1, a leading picture associated with the clean random access picture with the first variable indicating no output before recovery equal to 1, a first gradual decoder refresh picture with a third variable indicating no output before recovery equal to 1, or a recovering picture of a second gradual decoder refresh picture with a fourth variable indicating no output before recovery equal to 1 and the NAL unit header layer identifier equal to the first particular value, no picture that has been generated by a decoding process for generating an unavailable reference picture is referred to by an entry in a reference picture list of the current slice of the current picture.

17. The medium of claim 16, wherein the first rule specifies that under a second condition that the current picture is any picture that follows an intra random access point picture having a same value of an identifier of a layer to which a video coding layer network abstraction layer unit belongs or an identifier of a layer to which a non-video coding layer network abstraction layer unit applies in both the decoding order and an output order, the reference picture list for the current slice is disallowed to have an active entry that refers to a picture that precedes, in the decoding order or the output order, the intra random access point picture associated with the current picture.

18. The medium of claim 17, wherein the intra random access point picture is associated with zero or more leading pictures, and wherein the second condition is that the current picture follows the intra random access point picture having the same value of the identifier of the layer to which the video coding layer network abstraction layer unit belongs or the identifier of the layer to which the non-video coding layer network abstraction layer unit applies and the zero or more leading pictures in both the decoding order and the output order.

19. A method for storing bitstream of a video, comprising:
generating the bitstream of the video having one or more video layers comprising a current picture comprising a current slice of the current picture according to a first rule, and
storing the bitstream in a non-transitory computer-readable recording medium,
wherein the first rule specifies a first condition comprising that when the current picture with a network abstraction layer (NAL) unit header layer identifier equal to a first particular value is not a clean random access picture with a first variable indicating no output before recovery equal to 1, a picture, associated with a clean random access picture with a second variable indicating no output before recovery equal to 1, that precedes, in a decoding order, all leading pictures associated with the clean random access picture with the second variable indicating no output before recovery equal to 1, a leading picture associated with the clean random access picture with the first variable indicating no output before recovery equal to 1, a first gradual decoder refresh picture with a third variable indicating no output before recovery equal to 1, or a recovering picture of a second gradual decoder refresh picture with a fourth variable indicating no output before recovery equal to 1 and the NAL unit header layer identifier equal to the first particular value, no picture that has been generated by a decoding process for generating an unavailable reference picture is referred to by an entry in a reference picture list of the current slice of the current picture.

20. The method of claim 19, wherein the first rule specifies that under a second condition that the current picture is any picture that follows an intra random access point picture having a same value of an identifier of a layer to which a video coding layer network abstraction layer unit belongs or an identifier of a layer to which a non-video coding layer network abstraction layer unit applies in both the decoding order and an output order, the reference picture list for the current slice is disallowed to have an active entry that refers to a picture that precedes, in the decoding order or the output order, the intra random access point picture associated with the current picture;
wherein the intra random access point picture is associated with zero or more leading pictures, and wherein the second condition is that the current picture follows the intra random access point picture having the same value of the identifier of the layer to which the video coding layer network abstraction layer unit belongs or the identifier of the layer to which the non-video coding layer network abstraction layer unit applies and the zero or more leading pictures in both the decoding order and the output order.

* * * * *